(12) United States Patent
Lim et al.

(10) Patent No.: US 10,469,302 B2
(45) Date of Patent: Nov. 5, 2019

(54) METHOD FOR TRANSMITTING AND RECEIVING SIGNAL IN WIRELESS LAN AND APPARATUS THEREFOR

(71) Applicant: LG ELECTRONICS INC., Seoul (KR)

(72) Inventors: Dongguk Lim, Seoul (KR); Jinsoo Choi, Seoul (KR); Hangyu Cho, Seoul (KR); Eunsung Park, Seoul (KR); Wookbong Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/580,598

(22) PCT Filed: Mar. 11, 2016

(86) PCT No.: PCT/KR2016/002474
§ 371 (c)(1),
(2) Date: Dec. 7, 2017

(87) PCT Pub. No.: WO2016/200020
PCT Pub. Date: Dec. 15, 2016

(65) Prior Publication Data
US 2018/0176066 A1 Jun. 21, 2018

Related U.S. Application Data

(60) Provisional application No. 62/173,961, filed on Jun. 11, 2015.

(51) Int. Cl.
*H04L 1/00* (2006.01)
*H04L 1/18* (2006.01)
(Continued)

(52) U.S. Cl.
CPC .......... *H04L 27/2675* (2013.01); *H04L 1/00* (2013.01); *H04L 1/0031* (2013.01);
(Continued)

(58) Field of Classification Search
CPC ....... H04L 1/00; H04L 5/0053; H04L 1/1819; H04L 5/00; H04L 25/0202; H04L 5/0091;
(Continued)

(56) References Cited

U.S. PATENT DOCUMENTS

| 2011/0110348 A1* | 5/2011 | Lee ................. H04L 27/2613 370/338 |
| 2013/0121245 A1 | 5/2013 | Vermani et al. |

(Continued)

FOREIGN PATENT DOCUMENTS

| WO | 2012177993 A1 | 12/2012 |
| WO | 2013081364 A1 | 6/2013 |

(Continued)

*Primary Examiner* — David C Payne
*Assistant Examiner* — Sarah Hassan
(74) *Attorney, Agent, or Firm* — Dentons US LLP

(57) ABSTRACT

A method for receiving a signal by a station (STA) in a wireless LAN system according to an embodiment of the present invention comprises the steps of: receiving a multi-user (MU) frame including a SIG-A field, a SIG-B field and a short training field (STF), and a long training field (LTF) that provides training symbols; and performing blind-decoding of the SIG-B field using a group ID assigned to the STA, wherein the SIG-B field includes information on the number of streams assigned to each of multiple stations that receive the MU frame, and the starting position of a training symbol interval for the STA in the LTF is implicitly indicated by the number of streams assigned to each of other stations in the same group, which share the group ID with the STA, and the order in which the streams are assigned to the STA in the same group.

11 Claims, 20 Drawing Sheets

(51) Int. Cl.
*H04L 27/20* (2006.01)
*H04L 5/00* (2006.01)
*H04L 1/08* (2006.01)
*H04L 27/26* (2006.01)
*H04L 25/02* (2006.01)
*H04B 7/0452* (2017.01)
*H04L 25/03* (2006.01)
*H04W 84/12* (2009.01)

(52) U.S. Cl.
CPC .......... *H04L 1/0038* (2013.01); *H04L 1/0052* (2013.01); *H04L 1/08* (2013.01); *H04L 1/1819* (2013.01); *H04L 5/0048* (2013.01); *H04L 25/0204* (2013.01); *H04L 25/0224* (2013.01); *H04L 27/206* (2013.01); *H04L 27/26* (2013.01); *H04L 27/2602* (2013.01); *H04B 7/0452* (2013.01); *H04L 5/0094* (2013.01); *H04L 2025/0377* (2013.01); *H04W 84/12* (2013.01)

(58) Field of Classification Search
CPC ... H04L 1/0013; H04L 1/0038; H04L 1/0052; H04L 1/1874; H04L 1/188
USPC .......................................... 348/149; 375/260
See application file for complete search history.

(56) References Cited

U.S. PATENT DOCUMENTS

2017/0223665 A1\* 8/2017 Chun ..................... H04L 27/26
2017/0339692 A1\* 11/2017 Chun ................... H04L 1/0003

FOREIGN PATENT DOCUMENTS

WO   2014151546 A1   9/2014
WO   2014182065 A1   11/2014

\* cited by examiner

| | B1 B15 | B16 B17 | B18 B19 | B20 B21 | B22 B23 | B24 | B25 B29 | B30 | B31 |
|---|---|---|---|---|---|---|---|---|---|
| | VHT =0 | Link Adaptation Control | Calibration Position | Calibration Sequence | Reserved | CSI/Steering | NDP Announcement | Reserved | AC Constraint | RDG/ More PPDU |
| Bits: | 1 | 15 | 2 | 2 | 2 | 2 | 1 | 5 | 1 | 1 |

(a)

| B1 | B2 B5 | B6 B8 | B9 B15 |
|---|---|---|---|
| TRQ | MAI | MFSI | MFB/ASELC |
| 1 | 4 | 3 | 7 |

| | B1 | B2 | B3 B5 | B6 B8 | B9 B23 | B24 B26 | B27 | B28 | B29 | B30 | B31 |
|---|---|---|---|---|---|---|---|---|---|---|---|
| | VHT=1 | Reserved | MRQ | MSI | MFSI/ GID-L | MFB | GID-H | Coding Type | FB Tx Type | Unsolicited MFB | AC Constraint | RDG/ More PPDU |
| Bits: | 1 | 1 | 1 | 3 | 3 | 15 | 3 | 1 | 1 | 1 | 1 | 1 |

(a)

| B9 B11 | B12 B15 | B16 B17 | B16 B23 |
|---|---|---|---|
| VHT N_STS | MCS | BW | SNR |
| 3 | 4 | 2 | 6 |

| Frame Control | A1 | A2 | Sequence Control | A3 | A4 | Frame Body | FCS |
|---|---|---|---|---|---|---|---|
| 2 | 2 or 6 | 6 or 2 | 0 or 2 | 0 or 6 | 0 or 6 | variable | 4 |

Octets:

(a)

| B0 B1 | B2 B4 | B5 B7 | B8 | B9 | B10 | B11 | B12 | B13 | B14 | B15 |
|---|---|---|---|---|---|---|---|---|---|---|
| Protocol Version | Type | PTID/ Subtype | From DS | More Fragments | Power Management | More Data | Protected Frame | End of Service Period | Relayed Frame | Ack Policy |
| 2 | 3 | 3 | 1 | 1 | 1 | 1 | 1 | 1 | 1 | 1 |

Bits:

(b)

FIG. 23B
40 MHz
80 MHz
160 MHz

FIG. 24
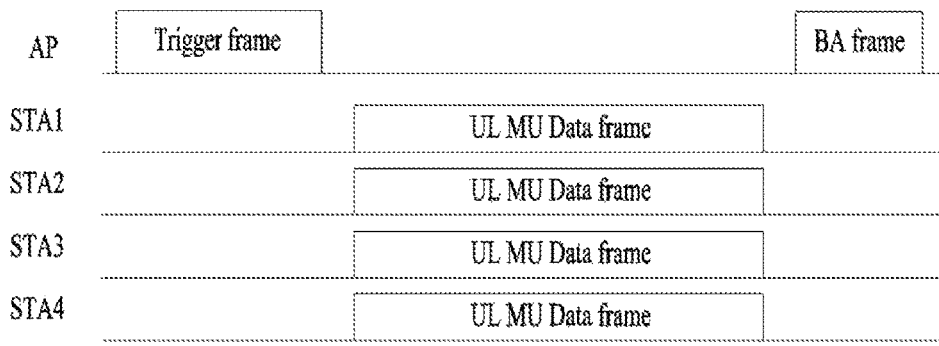
FIG. 25
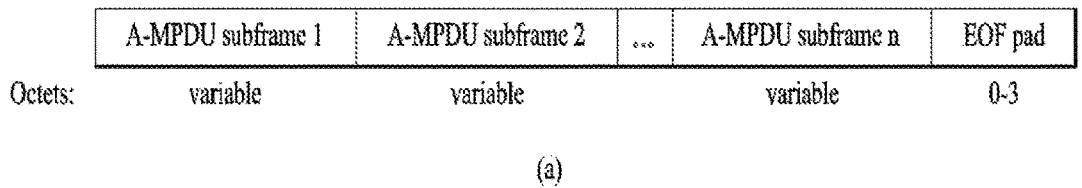
(a)
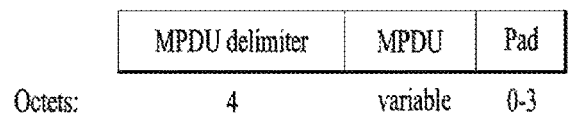
(b)
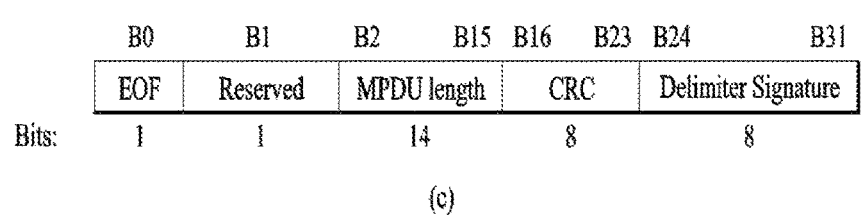
(c)

METHOD FOR TRANSMITTING AND RECEIVING SIGNAL IN WIRELESS LAN AND APPARATUS THEREFOR

This application is a 35 USC § 371 National Stage entry of International Application No. PCT/KR2016/002474 filed on Mar. 11, 2016, and claims priority to U.S. Provisional Application No. 62/173,961 filed on Jun. 11, 2015, all of which are hereby incorporated by reference in their entireties as if fully set forth herein.

TECHNICAL FIELD

The present specification relates to a wireless LAN system, and more particularly, to a method for transmitting or receiving a signal on the basis of MU-MIMO in a wireless LAN system and a station for performing the same.

BACKGROUND ART

While a signal transmission method proposed below is applicable to various types of wireless communication, a Wireless Local Area Network (WLAN) system will be described as an exemplary system to which the present disclosure is applicable.

WLAN Standards have been developed as Institute of Electrical and Electronics Engineers (IEEE) 802.11. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present invention is to provide a method for efficiently signaling user information specific to each STA in MU-MIMO based transmission in a wireless LAN system.

The technical objects that can be achieved through the present invention are not limited to what has been particularly described hereinabove and other technical objects not described herein will be more clearly understood by persons skilled in the art from the following detailed description.

Technical Solution

To achieve the object of the present invention, a method for receiving a signal by a station (STA) in a wireless LAN system according to one aspect of the present invention comprises receiving a multi-user (MU) frame including a signal-A (SIG-A) field, a signal-B (SIG-B) field and a short training field (STF), and a long training field (LTF) that provides training symbols; and blind decoding the SIG-B field using a group identifier (ID) assigned to the STA, wherein the SIG-B field may include information on a number of streams assigned to each of multiple STAs that receive the MU frame, and wherein a starting position of a training symbol interval for the STA in the LTF can be implicitly indicated by a number of streams assigned to each of the other STAs in a same group sharing the group ID with the STA, and an order of streams assigned to the STA in the same group.

To achieve the object of the present invention, a station (STA) in a wireless LAN system according to another aspect of the present invention comprises a receiver to receive a multi-user (MU) frame including a signal-A (SIG-A) field, a signal-B (SIG-B) field and a short training field (STF), and a long training field (LTF) that provides training symbols; and a processor to blind decode the SIG-B field using a group identifier (ID) assigned to the STA, wherein the SIG-B field may include information on a number of streams assigned to each of multiple STAs that receive the MU frame, and wherein a starting position of a training symbol interval for the STA in the LTF can be implicitly indicated by a number of streams assigned to each of the other stations in a same group sharing the group ID with the STA, and an order of streams assigned to the STA in the same group.

Preferably, a length of the training symbol interval of the STA corresponds to the number of streams assigned to the STA.

Preferably, the order of streams assigned to the STA in the same group may be indicated by an arrangement order of information on the number of streams assigned to the STA in the SIG-B field.

Preferably, the SIG-B field may be CRC(cyclic redundancy check)-masked with group IDs different from each other per 20 MHz channel, and blind decoding of the SIG-B field may be performed in a unit of 20 MHz channel.

More preferably, the number of streams assigned to each of the other STAs, which belong to the same group as the STA, is acquired together with the number of streams assigned to the STA in accordance with blind decoding of the SIG-B field in a unit of 20 MHz channel.

Preferably, the SIG-A field may include a frame format indicator, and in blind decoding of the SIG-B field, the group ID may be used when the frame format indicator indicates MU MIMO format.

Preferably, the SIG-B field may include a non-user specific part CRC-masked with the group ID, and a user specific part CRC masked with AID (Association ID) or PAID (Partial AID) of each of the multiple STAs.

Preferably, the non-user specific part may be omitted from the SIG-B field when the MU frame corresponds to the MU MIMO format, and the user specific part of the SIG-B field may be CRC-masked with the group ID.

Preferably, the STA may estimate a channel for the streams assigned to the STA on the basis of the starting position of the training symbol interval of the STA in the LTF.

Advantageous Effects

According to one embodiment of the present invention, user information specific to STA is detected based on group ID in MU-MIMO based transmission of a wireless LAN system, whereby complexity of blind-decoding may be reduced. Additional information may implicitly be indicated based on a position or order where the user information specific to the STA is detected, whereby signaling overhead may be reduced.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIGS. 14 to 18 are diagrams illustrating an example of a frame structure used in an IEEE 802.11 system.

FIGS. 19 to 21 are diagrams illustrating an MAC frame format.

FIG. 22 is a diagram illustrating a short MAC frame format.

FIG. 23B is a diagram illustrating a HE-SIG-B field structure of HE PPDU.

FIG. 24 is a diagram illustrating a method for performing uplink multi-user (UL MU) transmission in an AP station and a non-AP station.

FIG. 25 is a diagram illustrating an A-MPDU (Aggregate-MPDU) frame structure for UL MU transmission.

FIG. 27 is a diagram illustrating an MU-MIMO frame according to one embodiment of the present invention.

FIG. 28 is a diagram illustrating an MU-MIMO frame according to another embodiment of the present invention.

MODE FOR INVENTION

Figure 1:
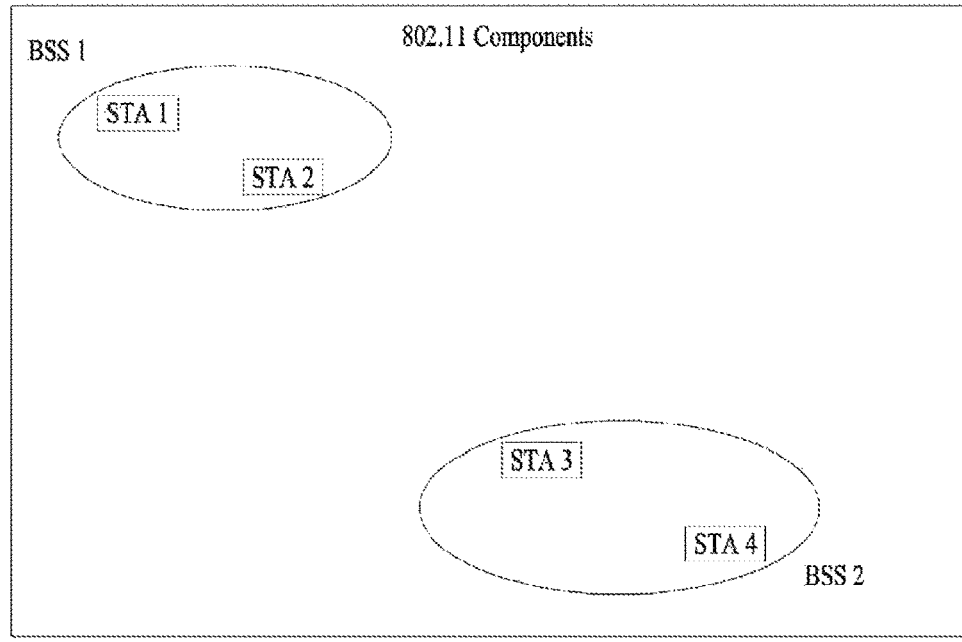
FIG. 1 is a diagram illustrating an exemplary configuration of a Wireless Local Area Network (WLAN) system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

In the present disclosure, a terminology, each of which includes such an ordinal number as 1st, 2nd and the like, may be used to describe various components. In doing so, the various components should be non-limited by the corresponding terminologies, respectively. The terminologies are only used for the purpose of discriminating one component from other components. For example, a first configuration element can be referred to as a second configuration element, similarly, the second configuration element can be referred to as the first configuration element while not being deviated from the scope of right according to the concept of the present specification.

In the present application, such a terminology as 'comprise', 'include' and the like should be construed not as excluding existence of a different configuration element but as designating further existence of a different configuration element. In this disclosure, such a terminology as '... unit', '... part' corresponds to a unit for processing at least one or more functions or operations. The unit can be implemented by a combination of hardware and/or software.

FIG. 1 is a view illustrating an exemplary configuration of a Wireless Local Area Network (WLAN) system.

As depicted in FIG. 1, a wireless local area network includes at least one Basic Service Set (BSS). The BSS is a set of Stations (STA) capable of communicating with each other by successfully performing synchronization.

The STA is a logical entity including a physical layer interface for a Medium Access Control (MAC) and wireless media. The STA includes an Access Point (AP) and a Non-AP STA. A mobile terminal operated by a user corresponds to the Non-AP STA among the STAs. If it is simply called an STA, the STA may correspond to the Non-AP STA. The Non-AP STA can be called such a different name as a terminal, a Wireless Transmit/Receive Unit (WTRU), User Equipment (UE), a Mobile Station (MS), a Mobile Terminal, a Mobile Subscriber Unit, or the like.

And, the AP is an entity providing an STA associated to the AP with an access to a Distribution System (DS) via the wireless media. The AP can be called a concentrated controller, a Base Station (BS), a Node-B, a Base Transceiver System (BTS), a site controller, or the like.

The BSS can be divided into an infrastructure BSS and an Independent BSS (IBSS).

The BSS depicted in FIG. 1 corresponds to the IBSS. The IBSS means the BSS not including an AP. Since the IBSS does not include the AP, an access to the DS is not permitted to the IBSS. Thus, the IBSS forms a self-contained network.

Figure 2:
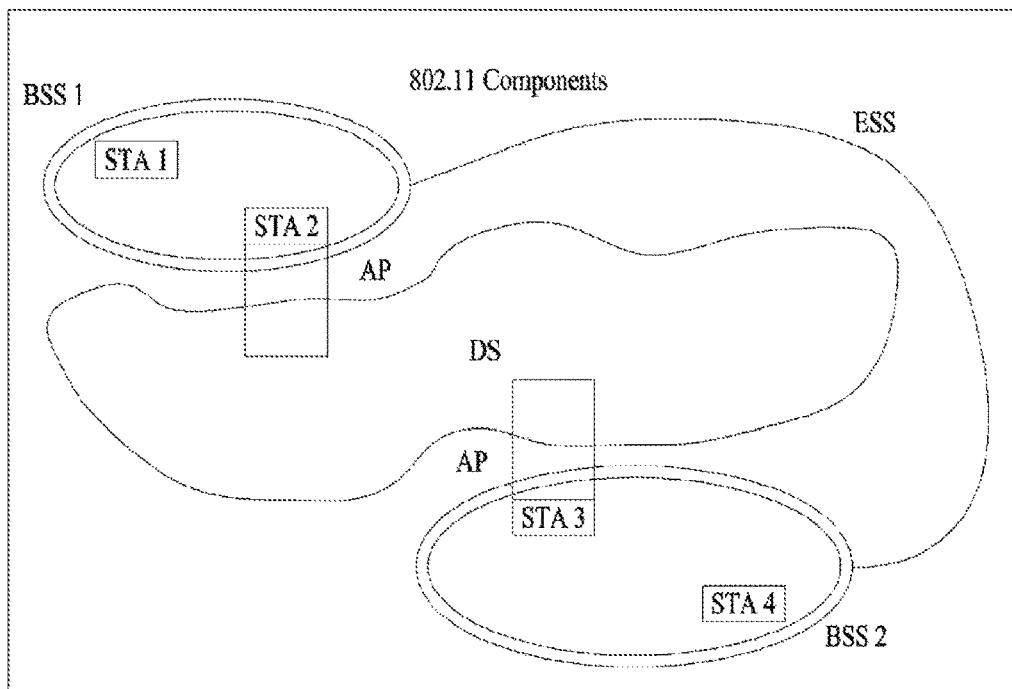
FIG. 2 is a diagram illustrating another exemplary configuration of a WLAN system.

FIG. 2 is a view illustrating another exemplary configuration of a WLAN system.

The BSS depicted in FIG. 2 corresponds to the infrastructure BSS. The infrastructure BSS includes at least one STA and an AP. Although a principle of a communication between non-AP STAs is to perform the communication via the AP, if a link is directly established between the non-AP STAs, it is possible to directly communicate between the non-AP STAs.

As depicted in FIG. 2, a plurality of infrastructure BSSs can be connected to each other via the DS. A plurality of the infrastructure BSSs connected through the DS is called an Extended Service Set (ESS). STAs included in the ESS can communicate with each other and a non-AP STA can move from one BSS to another BSS while seamlessly communicating in an identical ESS.

The DS is a mechanism connecting a plurality of APs to each other and the DS is not necessarily to be a network. If the DS is able to provide a prescribed distribution service, there is no limit on a form of the DS. For instance, the DS may correspond to such a wireless network as a mesh network or may correspond to a physical structure connecting APs to each other.

Figure 3:
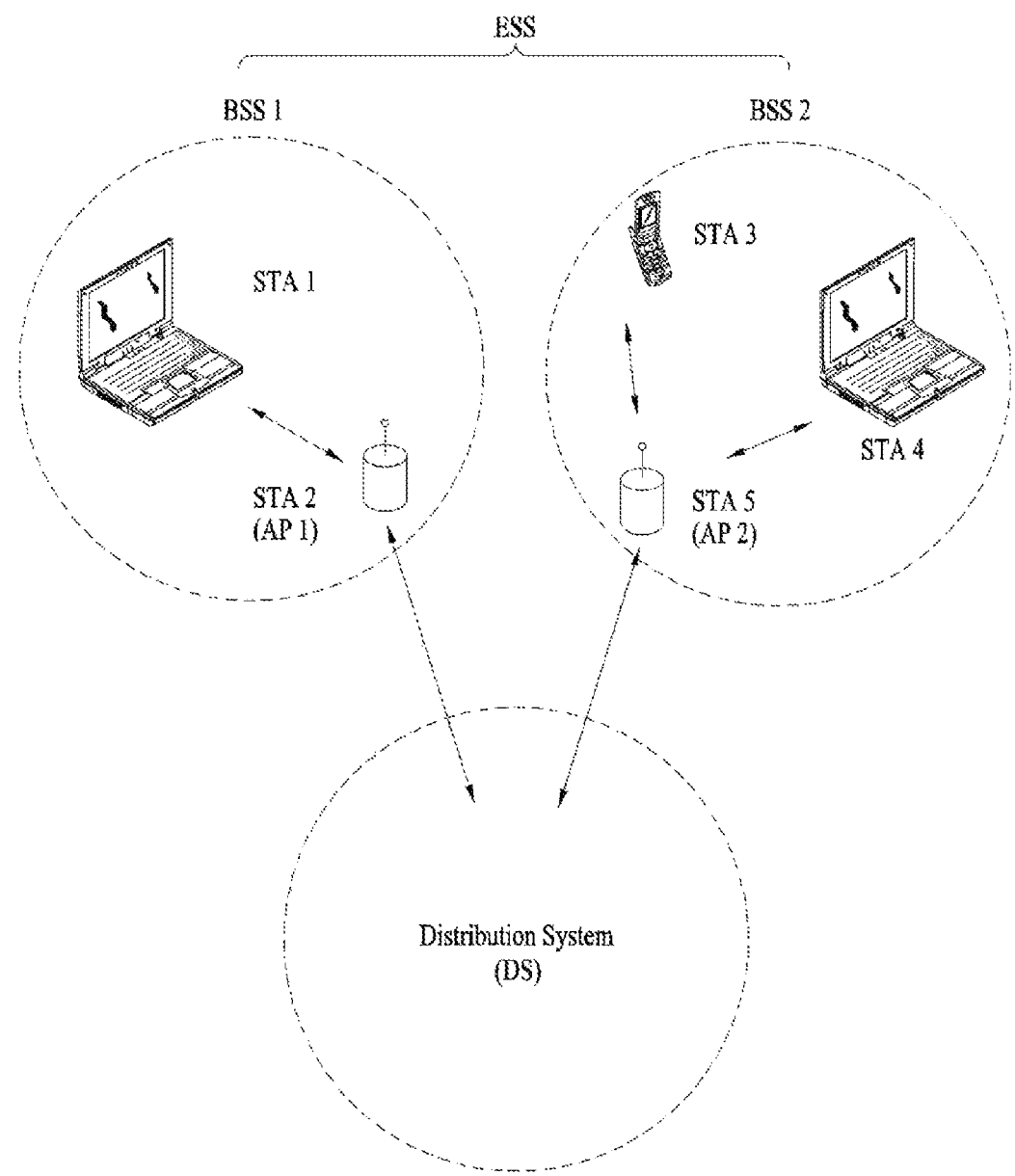
FIG. 3 is a diagram illustrating an exemplary structure of a WLAN system.

FIG. 3 is a view illustrating an exemplary structure of a WLAN system. In FIG. 3, an example of an infrastructure BSS including a DS is described.

Referring to an example of FIG. 3, ESS includes a BSS1 and BSS2. In a WLAN system, a station corresponds to a device operating according to MAC/PHY regulation of IEEE 802.11. A station includes an AP station and a non-AP station. In general, the non-AP station corresponds to such a device directly handled by a user as a laptop computer, a mobile phone, and the like. In the example of FIG. 3, a station 1, a station 3, and a station 4 correspond to the non-AP station and a station 2 and a station 5 correspond to the AP station.

In the following description, the non-AP station may be referred to as a terminal, a Wireless Transmit/Receive Unit (WTRU), a User Equipment (UE), a Mobile Station (MS), a mobile terminal, a Mobile Subscriber Station (MSS), and the like. And, the AP corresponds to a Base Station (BS), a Node-B, an evolved Node-B (eNB), a Base Transceiver System (BTS), a femto BS, and the like.

Figure 4:
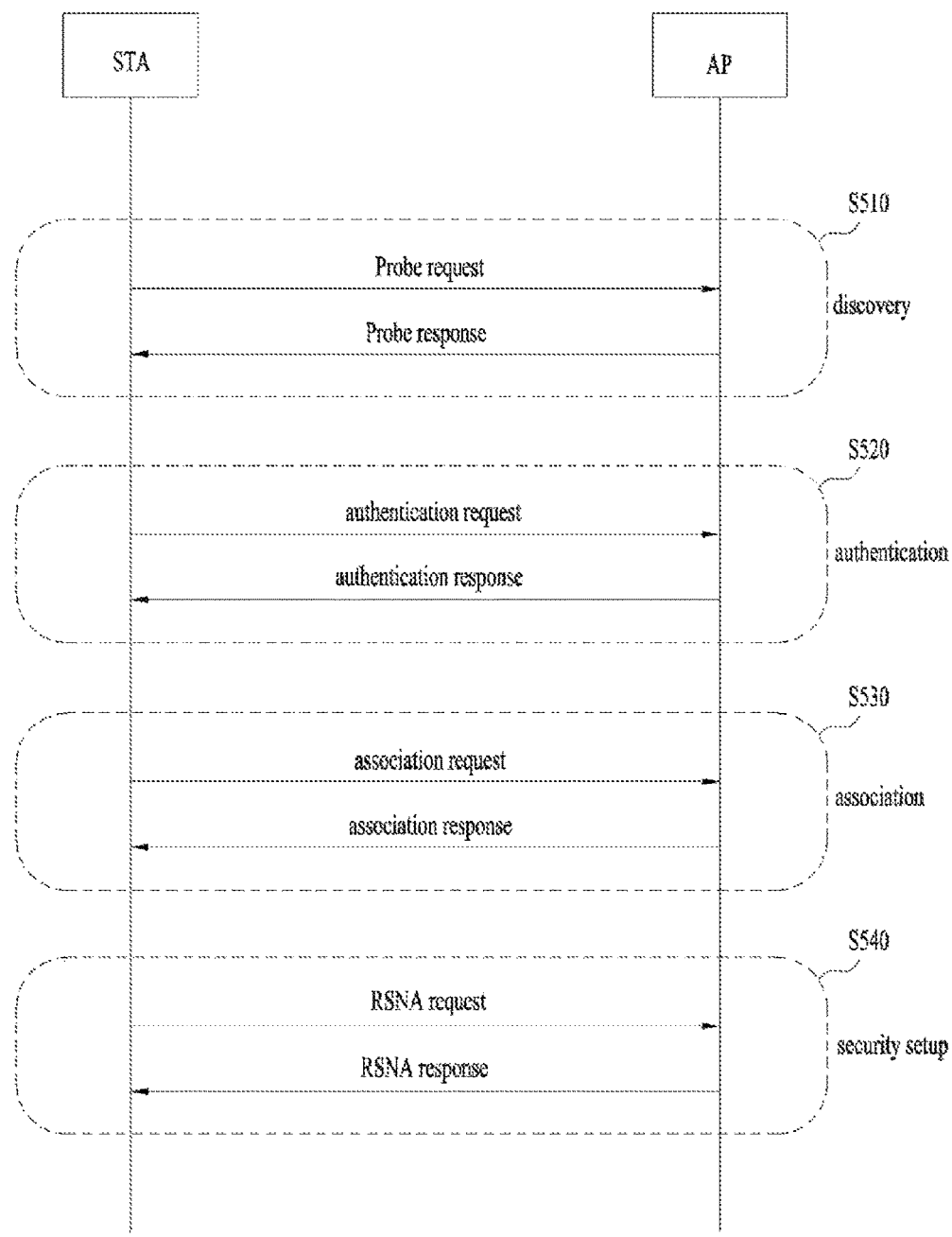
FIG. 4 is a diagram illustrating a link setup procedure in a WLAN system.
Figure 5:
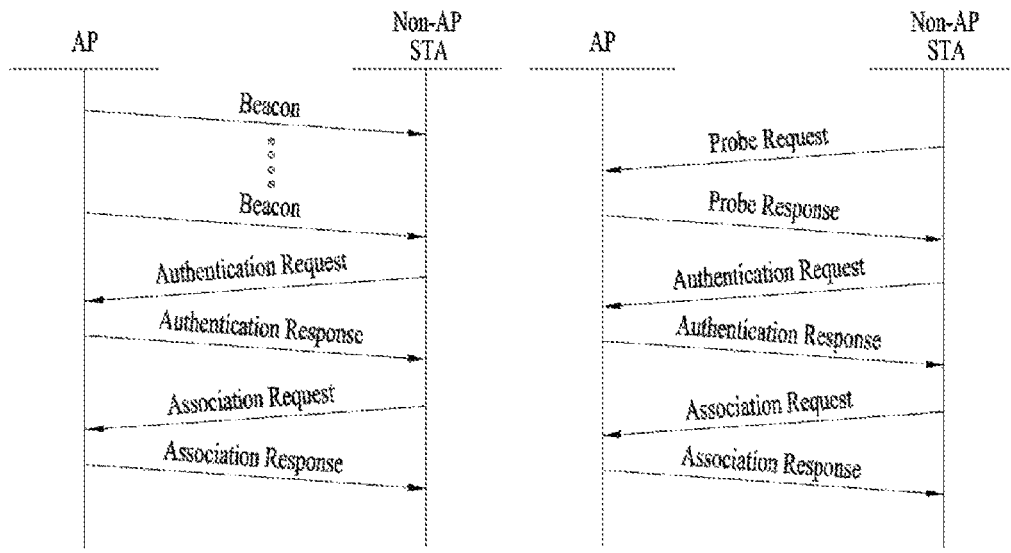
FIG. 5 is a diagram illustrating an active scanning and passive scanning method.

FIG. 4 is a flowchart illustrating a link setup procedure in a WLAN system, and FIG. 5 is a view illustrating an active scanning method and a passive scanning method.

In order for an STA to set up a link with a network and transceive data with the network, it is necessary for the station to discover the network, perform authentication, establish association, and pass through an authentication procedure for security. The link setup procedure can also be referred to as a session initiation procedure or a session setup procedure. And, discovery, authentication, association, and security setup procedures of the link setup procedure can be commonly called an association procedure.

An example of the link setup procedure is explained in the following with reference to FIG. 4.

In the step S410, an STA can perform a network discovery operation. The network discovery operation can include a scanning operation of the STA. In particular, in order for the STA to access a network, it is necessary for the STA to find out a network in which the STA is able to participate. The STA needs to identify a compatible network before participating in a wireless network. A procedure of identifying a network existing at a specific region is called scanning A scanning scheme includes active scanning and passive scanning. In FIG. 4, although a network discovery operation including an active scanning procedure is explained for example, an STA may operate with a passive scanning procedure.

According to the active scanning, a scanning performing STA transmits a probe request frame to a responder to discover an AP existing in the vicinity of the STA and waits for a response. The responder transmits a probe response frame to the STA, which has transmitted the probe request frame, in response to the probe request frame. In this case, the responder may correspond to an STA, which has lastly transmitted a beacon frame in a BSS on a channel being scanned. In the BSS, since an AP transmits a beacon frame, the AP becomes the responder. In an IBSS, since STAs in the IBSS alternately transmit a beacon, the responder is not fixed. For example, if an STA transmits a probe request frame on a channel 1 and receives a probe response frame on the channel 1, the STA stores BSS-related information included in the received probe response frame, moves to a next channel (e.g., a channel 2), and may be able to perform scanning (i.e., transmit and receive a probe request/response on the channel 2) using an identical method.

Referring to FIG. 5, scanning can also be performed by a passive scanning scheme. According to the passive scanning, a scanning performing STA waits for a beacon frame while switching a channel A beacon frame is one of management frames in IEEE 802.11. The beacon frame is periodically transmitted to notify the existence of a wireless network and make the scanning performing STA discover and participate in the wireless network. In a BSS, an AP plays a role in periodically transmitting a beacon frame. In an IBSS, STAs belonging to the IBSS alternately transmit a beacon frame. Having received a beacon frame, the scanning performing STA stores information on the BSS included in the beacon frame and records beacon frame information on each channel while switching to a different channel. Having received a beacon frame, an STA stores BSS-related information included in the received beacon frame, moves to a next channel, and may be able to perform scanning on the next channel using an identical method.

When the active scanning and the passive scanning are compared, the active scanning has a merit in that delay is less and power consumption is lower compared to the passive scanning After the network is discovered by the STA, an authentication procedure can be performed in the step S420. In order to clearly distinguish the authentication procedure from a security setup operation of the step S440, the authentication procedure can be referred to as a first authentication procedure.

According to the authentication procedure, the STA transmits an authentication request frame to the AP and the AP transmits an authentication response frame to the STA in response to the authentication request frame. An authentication frame used in the authentication request/response corresponds to a management frame.

The authentication frame include information on an authentication algorithm number, an authentication transaction sequence number, a status code, a challenge text, a Robust Security Network (RSN), a finite cyclic group, and the like. The above-mentioned information is just an example of information capable of being included in the authentication request/response. The information can be replaced with different information or may further include additional information.

The STA can transmit the authentication request frame to the AP. The AP can determine whether to grant authentication on the STA based on the information included in the received authentication request frame. The AP can transmit a result of the authentication procedure to the STA via the authentication response frame.

If the STA is successfully authenticated, an association procedure can be performed in the step S430. According to the association procedure, the STA transmits an association request frame to the AP and the AP transmits an association response frame to the STA in response to the association request frame.

For example, the association request frame can include such information as information related to various capabilities, a beacon listening interval, an SSID (service set identifier), supported rates, supported channels, an RSN, a mobility domain, supported operating classes, a TIM (traffic indication map broadcast request), interworking service capability, and the like.

For example, the association response frame can include such information as information related to various capabilities, a status code, an Association ID (AID), supported rates, an Enhanced Distributed Channel Access (EDCA), a parameter set, a Received Channel Power Indicator (RCPI), a Received Signal to Noise Indicator (RSNI), a mobility domain, a timeout interval (association comeback time), an overlapped BSS scan parameter, TIM broadcasting response, QoS map, and the like.

The above-mentioned information is just an example of information capable of being included in the association request/response frame. The information can be replaced with different information or may further include additional information.

If the STA is successfully associated with the network, the security setup procedure can be performed in the step S540. The security setup procedure of the step S440 can also be referred to as an authentication procedure via an RSNA (robust security network association) request/response. The authentication procedure of the step S520 can be referred to as a first authentication procedure and the security setup procedure of the step S540 can be simply referred to as an authentication procedure.

For example, the security setup procedure of the step S440 may include a private key setup procedure via 4-way handshaking through an Extensible Authentication Protocol over LAN (EAPOL) frame. And, the security setup procedure can also be performed according to a security scheme not defined in IEEE 802.11 standard.

Based on the aforementioned discussion, a collision detection technique in a WLAN system is explained in the following.

As mentioned in the foregoing description, since various elements influence on a channel in wireless environment, a transmitting end is unable to precisely detect a collision. Hence, 802.11 has introduced a Distributed Coordination Function (DCF) corresponding to a Carrier Sense Multiple Access/Collision Avoidance (CSMA/CA) mechanism.

Figure 6:
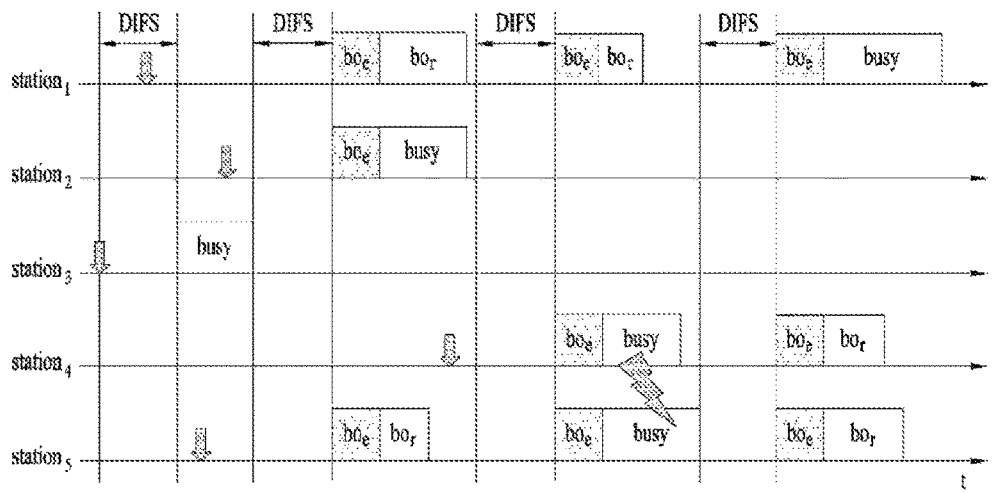
FIG. 6 is a diagram illustrating a Distributed Coordinated Function (DCF) mechanism in a WLAN system.

FIG. 6 is a view illustrating a DCF mechanism in a WLAN system.

A DCF performs Clear Channel Assessment (CCA) that senses a medium during a specific period (e.g., DIFS: DCF inter-frame space) before data is transmitted by STAs including data to be transmitted. In this case, if a medium is idle (available), an STA can transmit a signal using the medium. However, if a medium is busy (unavailable), an STA can transmit data after waiting for a period as much as a random backoff period in addition to a DIFS under an assumption that many STAs are waiting for the use of the medium. In this case, the random backoff period plays a role in avoiding a collision. If it is assumed that there are many STAs to transmit data, each of the STAs has a statistically different backoff interval value. Consequently, each of the STAs has different transmission timing. If an STA starts to transmit data using the medium, other STAs are unable to use the medium.

A random backoff time and a procedure are briefly explained in the following.

If a state of a specific medium is switched to idle from busy, a plurality of STAs start to prepare for data transmission. In this case, in order to minimize collision, each of a plurality of the STAs intending to transmit data selects a random backoff count and waits for slot time as much as the random backoff count. The random backoff count is a pseudo-random integer value and the value is selected from among values uniformly distributed in a range of [0 CW]. In this case, the CW stands for 'contention window'.

A CW parameter selects a CWmin value as an initial value. If transmission fails, the CWmin value becomes twice the initial value. For example, if it fails to receive an ACK response in response to a transmitted data frame, it may consider it as a collision. If a CW value has a CWmax value, the CWmax value is maintained until data transmission is succeeded. The CW value is reset to the CWmin value when the data transmission is succeeded. In this case, in order to conveniently implement and operate the CW, the CWmin, and the CWmax, it is preferable to configure the CW, the CWmin, and the CWmax to be maintained by 2n−1.

Meanwhile, if a random backoff procedure starts, an STA selects a random backoff count from among a range of [0 CW] and continuously monitors a medium while a backoff slot is countdown. If the medium is switched to a busy state, the STA temporarily stops countdown. If the medium is switched back to the idle, the STA resumes countdown of the backoff slot.

Referring to FIG. 6, many STAs intend to transmit data. In case of an STA 3, since a medium was idle as much as a DIFS, the STA 3 immediately transmits a data frame and the rest of STAs wait until the medium becomes idle. Since the medium was busy for a while, a plurality of STAs are waiting for a chance of using the medium. Hence, each of a plurality of the STAs selects a random backoff count. In this case, FIG. 6 shows a case that an STA 2, which has selected a smallest backoff count, transmits a data frame.

After the transmission of the STA 2 is finished, the medium becomes idle again and the STAs resume countdown for the temporarily stopped backoff interval. Referring to FIG. 6, although an STA 5, which has a next smallest random backoff count value and temporarily stopped countdown when the medium is busy, count downs the remaining backoff slot and transmits a data frame, it is overlapped with a random backoff count value of an STA 4 by chance. It is able to see that a collision occurs. In this case, since both the STA 5 and the STA 4 are unable to receive an ACK response in response to a transmitted data, the STAs select a random backoff count value again after CW is increased as much as twice.

As mentioned in the foregoing description, the most fundamental principle of the CSMA/CA is carrier sensing. A terminal is able to use physical carrier sensing and virtual carrier sensing to determine whether or not a DCF medium is busy/idle. The physical carrier sensing is performed at a PHY (physical layer) and the physical carrier sensing is performed through energy detection or preamble detection. For example, if it is determined as a receiving end has measured a power level or has read a preamble, it can be considered as a medium is busy. The virtual carrier sensing is performed by setting a Network Allocation Vector (NAV) to make other STAs not transmit data. The virtual carrier sensing is performed through a duration field value of a MAC header. Meanwhile, in order to reduce possibility of collision, a robust collision detection mechanism has been introduced. The reason for the introduction of the robust collision detection mechanism can be checked by two examples described in the following. For clarity, assume that a carrier sensing range is identical to a transmission range.

Figure 7:
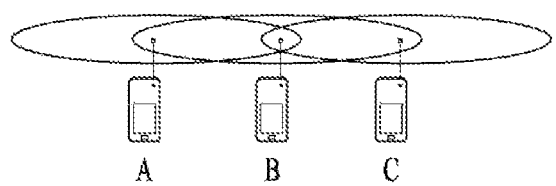
FIGS. 7 and 8 are exemplary diagrams describing problems encountered with a conventional collision resolution mechanism.
Figure 8:
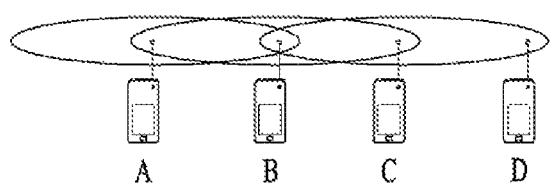

FIGS. 7 and 8 are view illustrating exemplary problems of a conventional collision resolution mechanism.

Specifically, FIG. 7 is a view illustrating hidden node issues. The present example shows a case that an STA A is communicating with an STA B and an STA C has information to be transmitted. Specifically, when the STA A transmits information to the STA B, since the STA C is out of transmission range of the STA A at the time of performing carrier sensing on a medium before transmitting data to the STA B, the STA C is unable to detect a signal transmitted by the STA A and there is a possibility that the medium is considered as being in an idle state. As a result, since the STA B receives information of the STA A and information of the STA C at the same time, a collision occurs. In this case, the STA A can be regarded as a hidden node of the STA C.

Meanwhile, FIG. 8 is a view illustrating exposed node issues. Currently, the STA B transmits data to the STA A. In this case, when the STA C performs carrier sensing, since the STA B is in a state of transmitting information, the carrier sensing shows a result that a medium is busy. As a result, although the STA C wants to transmit data to an STA D, since the media is sensed as busy, the STA C may unnecessarily wait until the medium becomes idle. In particular, although the STA A is located at the outside of a CS range of the STA C, the STA A may block information transmission of the STA C. In this case, the STA C becomes an exposed node of the STA B.

In order to make good use of a collision avoidance mechanism in the aforementioned situation, it may be able to introduce such a short signaling packet as RTS (request to send), CTS (clear to send), and the like. In particular, it may be able to use the short signaling packet to enable surrounding STAs to overhear whether or not two STAs transmit information. In particular, if an STA intending to transmit data transmits an RTS frame to an STA receiving the data, the receiving end STA can inform surrounding terminals that the receiving end STA is going to receive data by transmitting a CTS frame to the surrounding terminals.

Figure 9:
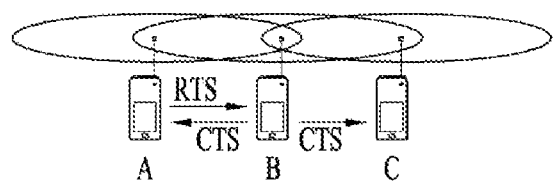
FIG. 9 is a diagram illustrating a mechanism of solving a hidden node issue using a Ready To Send (RTS)/Clear To Send (CTS) frame.

FIG. 9 is a diagram for explaining a mechanism of solving a hidden node issue using an RTS/CTS frame.

Referring to FIG. 9, both the STA A and the STA C intend to transmit data to the STA B. If the STA A sends RTS to the STA B, the STA B sends CTS to both the STA A and the STA C located near the STA B. As a result, the STA C waits until data transmission between the STA A and the STA B is finished. By doing so, it is able to avoid a collision.

Figure 10:
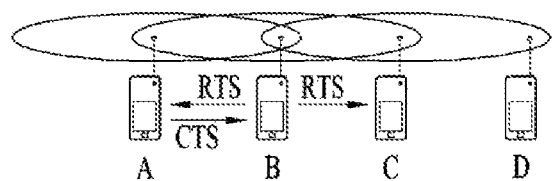
FIG. 10 is a diagram illustrating a mechanism of solving an exposed node issue using an RTS/CTS frame.

FIG. 10 is a view illustrating a mechanism of solving an exposed node issue using an RTS/CTS frame.

Referring to FIG. 10, the STA C overhears RTS/CTS transmission between the STA A and the STA B. By doing so, although the STA C transmits data to a different STA D, the STA C is able to know that a collision does not occur. In particular, the STA B transmits RTS to all terminals located near the STA B and transmits CTS to the STA A only to which data is to be practically transmitted. Since the STA C receives the RTS and does not receive the CTS of the STA A, the STA C is able to know that the STA A is located at the outside of a CS range of the STA C.

Figure 11:
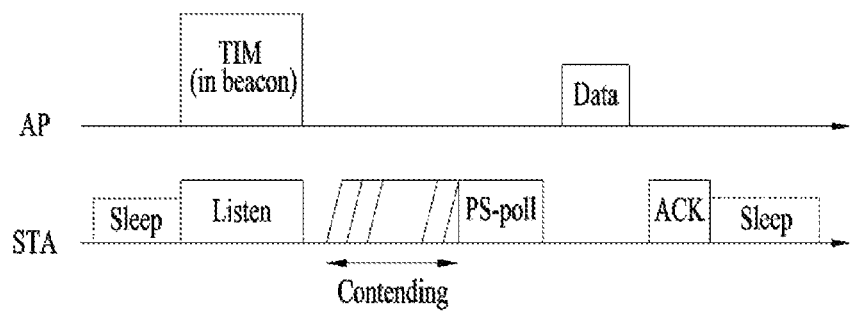
FIGS. 11 to 13 are detailed diagrams illustrating an operation of a station that has received TIM.
Figure 12:
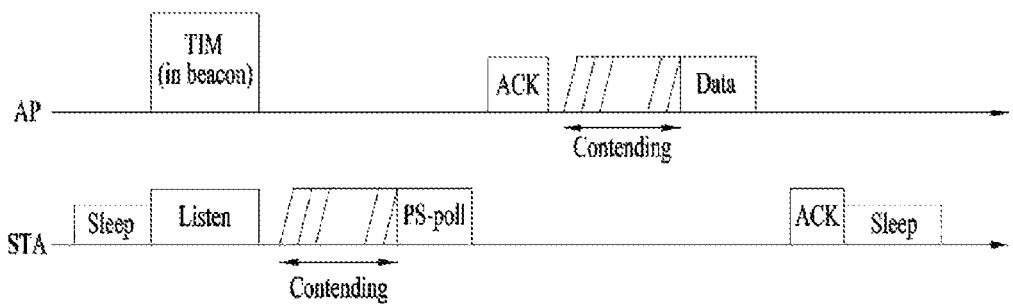
Figure 13:
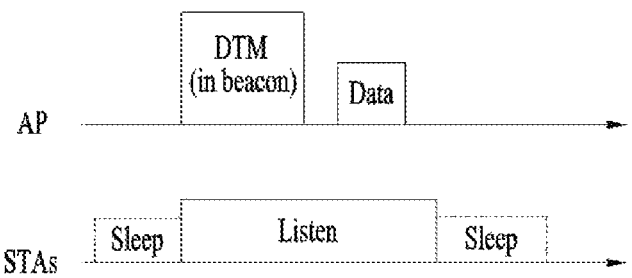
Figure 14:
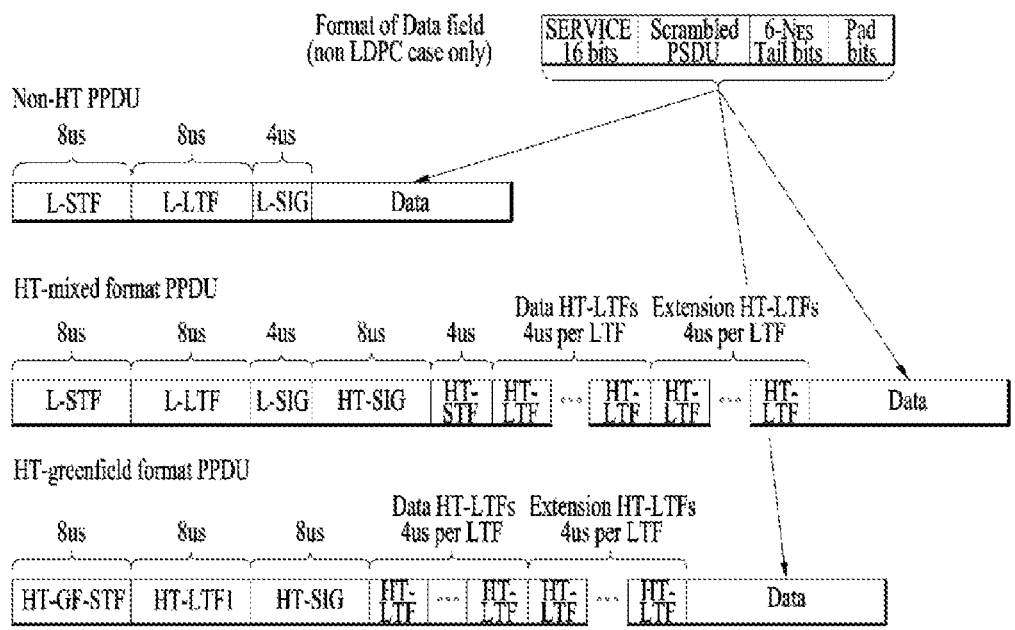

FIGS. 11 to 13 are views illustrating an operation of an STA which has received TIM.

Referring to FIG. 11, an STA switches to an awake state from a sleep state to receive a beacon frame including a TIM from an AP and interprets the received TIM element. By doing so, the STA is able to know there is a buffered traffic to be transmitted to the STA. The STA performs contending with other STAs to access a medium for transmitting a PS-poll frame and may be then able to transmit the PS-poll frame to request data frame transmission to the AP. Having received the PS-poll frame transmitted by the STA, the AP can transmit a frame to the STA. The STA receives a data frame and may be able to transmit a confirmation response (ACK) to the AP in response to the data frame. Subsequently, the STA can switch back to the sleep state.

As shown in FIG. 11, having received the PS-poll frame from the STA, the AP may operate according to an immediate response scheme that a data frame is transmitted after prescribed time (e.g., SIFS (short-inter-frame space)). Meanwhile, after the AP receives the PS-poll frame, if the AP fails to prepare a data frame to be transmitted to the STA during SIFS time, the AP may operate according to a deferred response scheme. Regarding this, it is explained in the following with reference to FIG. 12.

In the example shown in FIG. 12, similar to the example of FIG. 11, the STA switches to the awake state from the sleep state, receives a TIM from the AP, performs contending with other STAs, and transmits the PS-poll frame to the AP. If the AP fails to prepare a data frame during an SIFS after the PS-poll frame is received, the AP can transmit an ACK frame instead of the data frame to the STA. If the data frame is ready after the ACK frame is transmitted, the AP can transmit the data frame to the STA after contending is performed. The STA transmits an ACK frame to the AP to indicate that the data frame is successfully received and can switch back to the sleep state.

FIG. 13 illustrates an example in which the AP transmits a DTIM. Stations can switch to the awake state from the sleep state to receive a beacon frame including a DTIM element from the AP. Having received the DTIM, the STAs are able to know that a multicast/broadcast frame is to be transmitted. After the beacon frame including the DTIM is transmitted, the AP can immediately transmit data (i.e., the multicast/broadcast frame) without an operation of transmitting and receiving a PS-poll frame. Having received the beacon frame including the DTIM, the STAs receive data while continuously maintaining the awake state and may be able to switch back to the sleep state after the data reception is completed.

FIGS. 14 to 18 are views illustrating exemplary frame structures used in an IEEE 802.11 system.

An STA can receive a Physical Layer Convergence Protocol (PLCP) Packet Data Unit (PPDU). In this case, a PPDU frame format can be configured in a manner of including a Short Training Field (STF), a Long Training Field (LTF), a SIGnal (SIG) field, and a data field. In this case, as an example, the PPDU frame format can be configured based on a type of the PPDU frame format.

As an example, a non-High Throughput (non-HT) PPDU frame format can be configured by a Legacy-STF (L-STF) field, a Legacy-LTF (L-LTF) field, an SIG field, and a data field only.

And, the type of the PPDU frame format can be configured by either a HT-mixed format PPDU or a HT-greenfield format PPDU. In this case, the aforementioned PPDU format can further include an additional (a different type of) STF, LTF, and an SIG field between the SIG field and the data field.

Figure 15:
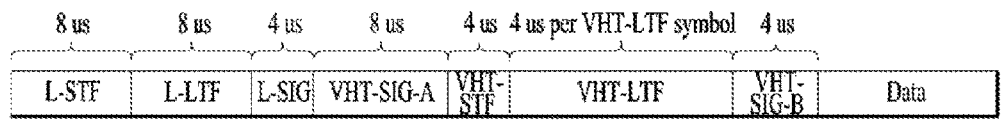

Referring to FIG. 15, it may be able to configure a Very High Throughput (VHT) PPDU format. In this case, the VHT PPDU format can also further include an additional (a different type of) STF, LTF, and an SIG field between the SIG field and the data field. More specifically, the VHT PPDU format can include at least one of a VHT-SIG-A field, a VHT-STF field, a VHT-LTF field, and a VHT-SIG-B field between the L-SIG field and the data field.

In this case, the STF may correspond to a signal for signal detection, Automatic Gain Control (AGC), diversity selection, minute time synchronization, and the like. And, the LTF may correspond to a signal for channel estimation, frequency error estimation, and the like. In this case, both the STF and the LTF can be referred to as a PCLP preamble. The PCLP preamble may correspond to a signal for OFDM physical layer synchronization and channel estimation.

Figure 16:
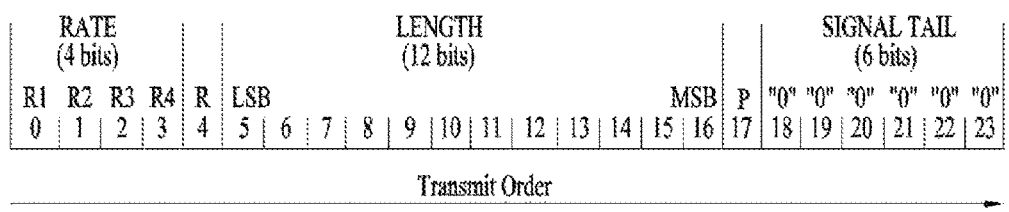

Referring to FIG. 16, the SIG field can include a RATE field, a LENGTH field, and the like. The RATE field can include information on modulation and a coding rate of a data. The LENGTH field can include information on a data length. In addition, the SIG field can include a parity bit, an SIG TAIL bit, and the like.

The data field can include a SERVICE field, a PSDU (PLCP service data unit), a PPDU TAIL bit. If necessary, the data field can further include a padding bit.

Figure 17:
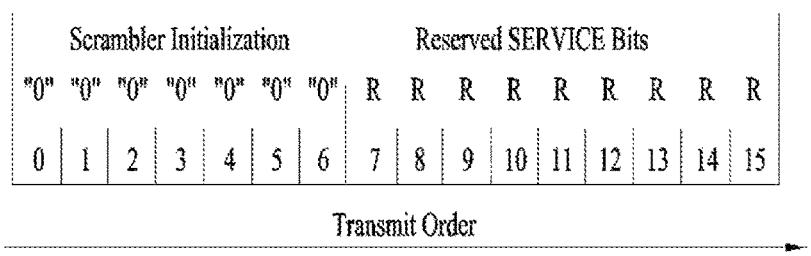

In this case, referring to FIG. 17, a partial bit of the SERVICE field can be used for synchronization of a descrambler in a receiving end and a partial bit can be configured by a reserved bit. The PSDU corresponds to a MAC Protocol Data Unit (PDU) defined in a MAC layer and can include data generated/used in a higher layer. The PPDU TAIL bit can be used for returning an encoder to a zero state. The padding bit can be used for matching a length of a data field with a prescribed unit.

And, as mentioned in the foregoing description, the VHT PPDU format can include an additional (or a different type of) STF, LTF, and an SIG field. In this case, L-STF, L-LTF, and L-SIG may correspond to a part of non-VHT in the VHT PPDU. In this case, VHT-SIG A, VHT-STF, VHT-LTF, and VHT-SIG may correspond to a part of VHT in the VHT PPDU. In particular, a field for the non-VHT and a region for the VHT field can be respectively defined in the VHT PPDU. In this case, as an example, the VHT-SIG A can include information for interpreting the VHT PPDU.

Figures 18, 19:
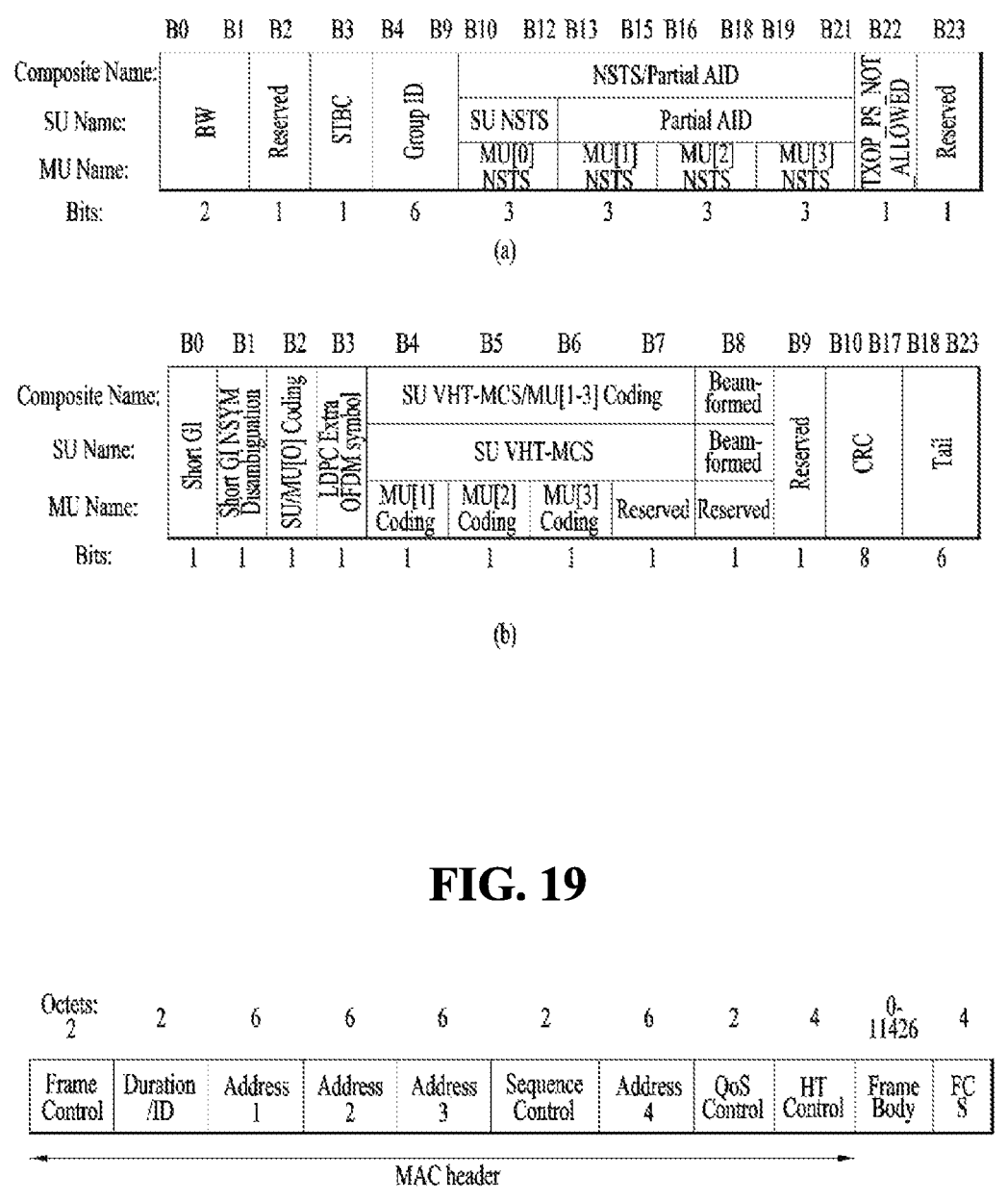

In this case, as an example, referring to FIG. 18, the VHT-SIG A can be configured by VHT SIG-A1 (FIG. 18 (a)) and VHT SIG-A2 (FIG. 18 (b)). In this case, each of the VHT SIG-A1 and the VHT SIG-A2 can be configured by 24 data bits and the VHT SIG-A1 can be transmitted prior to the VHT SIG-A2. In this case, the VHT SIG-A1 can include a BW field, an STBC field, a group ID field, an NSTS/partial AID field, a TXOP_PS_NOT_ALLOWED field, and a reserved field. And, the VHT SIG-A2 can include a short GI field, a short GI NSYM disambiguation field, an SU/MU[0] coding field, an LDPC extra OFDM symbol field, an SU VHT-MCS/MU[1-3] coding field, a beamformed field, a CRC field, a tail field, and a reserved field. Through the aforementioned fields, it may be able to check information on the VHT PPDU.

FIGS. 19, 20, and 21 are views illustrating a MAC frame format.

An STA may receive a PPDU in one of the above-described PPDU formats. A PSDU in a data part of the PPDU frame format may include a MAC PDU. The MAC PDU may be defined in various MAC frame formats, and a basic MAC frame may include a MAC header, Frame Body, and Frame Check Sequence (FCS).

For example, referring to FIG. 19, the MAC header may include Frame Control, Duration/ID, Addresses, Sequence Control, QoS Control, and HT Control. In the MAC header, the Frame Control field may include control information required for frame transmission/reception. The Duration/ID field may be set to a time required to transmit the frame. The Address fields may include identification information about a transmitter and a receiver, which will be described later. For the Sequence Control, QoS Control, and HT Control fields, refer to the IEEE 802.11 standard specifications.

For example, the HT Control field may be configured in two types, HT variant and VHT variant, and include different information according to the types. Referring to FIGS. 20 and 21, a VHT subfield of the HT Control field may indicate whether the HT Control field is the HT-variant type or the VHT-variant type. For example, if the VHT subfield is set to '0', the HT Control field may be the HT-variant type, and if the VHT subfield is set to '1', the HT Control field may be the VHT-variant type.

For example, referring to FIG. 20, if the HT Control field is the HT-variant type, the HT Control field may include Link Adaptation Control, Calibration Position, Calibration Sequence, CSI/Steering, HT NDP Announcement, AC constraint, RDG/More PPDU, and Reserved fields. For example, referring to (b) of FIG. 20, the Link Adaptation Control field may include TRQ, MAI, MFSI, and MFB/ASELC. For more details, refer to the IEEE 802.11 standard specifications.

For example, referring to FIG. 21, if the HT Control field is the VHT-variant type, the HT Control field may include MRQ, MSI, MFSI/GID-LM, MFB GID-H, Coding Type, FB Tx Type, Unsolicited MFB, AC constraint, RDG/More PPDU, and Reserved fields. For example, referring to (b) of FIG. 21, the MFB field may include VHT N_STS, MCS, BW, and SNR.

FIG. 22 is a view illustrating a Short MAC frame format. A MAC frame may be configured as a Short MAC frame by reducing unnecessary information when needed, to prevent waste of radio resources. For example, referring to FIG. 22, the MAC header of a Short MAC frame may always include a Frame Control field, an A1 field, and an A2 field. The MAC header may selectively include a Sequence Control field, an A3 field, and an A4 field. Since information unnecessary for a MAC frame is not included in a Short MAC frame in this manner, radio resources may be conserved.

For example, the Frame Control field of the MAC header may include Protocol Version, Type, PTID/Subtype, From DS, More Fragment, Power Management, More Data, Protected Frame, End of Service Period, Relayed Frame, and Ack Policy. For a description of each subfield of the Frame Control field, refer to the IEEE 802.11 standard specifications.

Meanwhile, the Type field of the Frame Control field in the MAC header may be 3 bits with value 0 to value 3 providing address information and value 4 to value 7 being reserved. New address information may be provided using the reserved values in the present disclosure, which will be described later.

In the Frame Control field of the MAC header, the From DS field may be 1 bit.

Each of the More Fragment, Power Management, More Data, Protected Frame, End of Service Period, Relayed Frame, and Ack Policy fields may be configured in 1 bit. The Ack Policy field may provide ACKnowledgement/Negative ACKnowledgement (ACK/NACK) information in 1 bit.

Regarding STAs using a frame constructed in the above-described format, an AP VHT STA may support a non-AP VHT STA operating in a Transmit Opportunity (TXOP) power save mode in a BSS. For example, the non-AP VHT STA may operate in the TXOP power save mode in an awake state. The AP VHT STA may switch the non-AP VHT STA to a doze state during a TXOP. For example, the AP VHT STA may command the non-AP VHT STA to switch to the doze state by transmitting a VHT PPDU with a TXVECTOR parameter, TXOP_PS_NOT_ALLOWED set to 0. Parameters in TXVECTOR transmitted along with the VHT PPDU by the AP VHT STA may be changed from 1 to 0 and maintained during the TXOP. Therefore, power may be saved during the remaining TXOP.

On the contrary, if TXOP_PS_NOT_ALLOWED is set to 1 and thus power saving is not performed, the parameters in TXVECTOR may be kept unchanged.

For example, as described before, the non-AP VHT STA may switch to the doze state in the TXOP power save mode during a TXOP, if the following conditions are satisfied.

A VHT MU PPDU is received, and the STA is not indicated as a group member by an RXVECTOR parameter, Group_ID.

An SU PPDU is received, and an RXVECTOR parameter, PARTIAL_AID is not 0 or does not match the partial AID of the STA.

Although the STA determines that the RXVECTOR parameter, PARTIAL_AID matches the partial AID of the STA, a receiver address of the MAC header does not match the MAC address of the STA.

Although the RXVECTOR parameter, Group_ID indicates that the STA is a group member, an RXVECTOR parameter, NUM_STS is set to 0.

A VHT NDP Announcement frame is received, and the RXVECTOR parameter, PARTIAL_AID is set to 0 and does not match the AID of an Info field for the STA.

The STA receives a frame with More Data set to 0 and Ack Policy set to No Ack, or transmits an ACK with Ack Policy set to a value other than No Ack.

The AP VHT STA may include a Duration/ID value set to the remaining TXOP interval and a NAV-SET Sequence (e.g., Ready To Send/Clear To Send (RTS/CTS)). Herein, the AP VHT STA may not transmit a frame to the non-AP VHT STA switching to the doze state based on the above-described conditions during the remaining TXOP.

For example, if the AP VHT STA transmits a VHT PPDU with the TXVECTOR parameter, TXOP_PS_NOT_ALLOWED set to 0 in the same TXOP and does not want the STA to switch from the awake state to the doze state, the AP VHT STA may not transmit a VHT SU PPDU.

For example, the AP VHT STA may not transmit a frame to a VHT STA that has switched to the doze state before timeout of a NAV set at the start of a TXOP.

If the AP VHT STA fails to receive an ACK after transmitting a frame including at least one of a MAC Service Data Unit (MSDU), an Aggregated-MSDU (A-MSDU), and a MAC Management Protocol Data Unit (MMPDU), with More Data set to 0, the AP VHT STA may retransmit the frame at least once in the same TXOP. For example, if the AP VHT STA fails to receive an ACK for a retransmission in the last frame of the same TXOP, the AP VHT STA may retransmit the frame after waiting until the next TXOP.

For example, the AP VHT STA may receive a Block Ack frame from a VHT STA operating in the TXOP power save mode. The Block Ack frame may be a response to an A-MPDU including an MPDU with More Data set to 0. Herein, the AP VHT STA is in the doze state and may not receive a response to the sub-sequence of a retransmitted MPDU during the same TXOP.

Further, a VHT STA that has operated in the TXOP power save mode and switched to the doze state may activate a NAV timer while it stays in the doze state. For example, upon expiration of the timer, the VHT STA may transition to the awake state.

Further, the STA may contend for medium access, upon expiration of the NAV timer.

HE PPDU

Figure 23A:
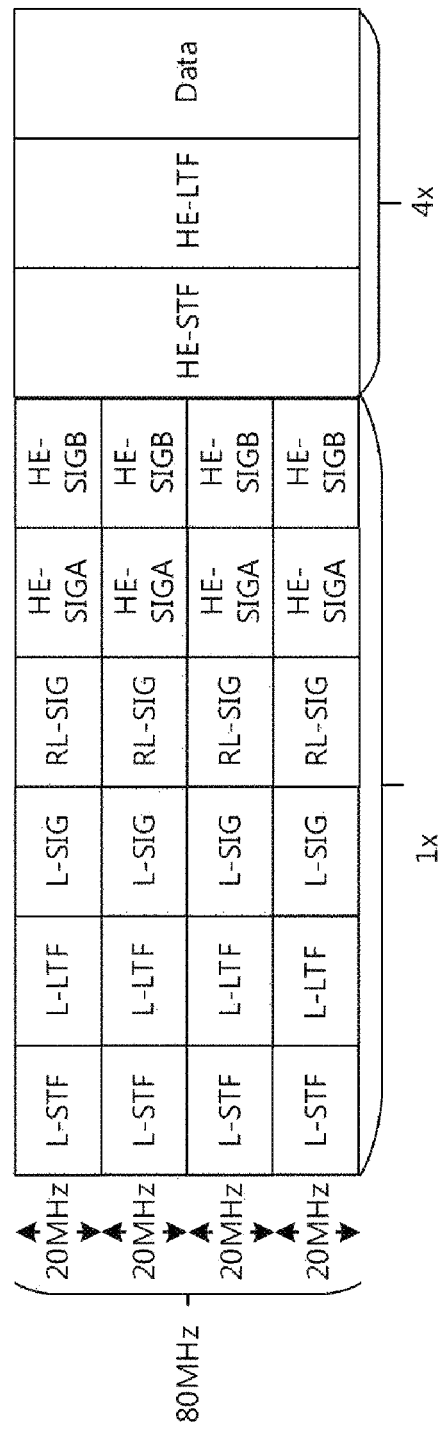
FIG. 23A is a diagram illustrating an example of a high efficiency (HE) PPDU format.

FIG. 23A is a diagram illustrating an example of a high efficiency (HE) PPDU format. The HE PPDU format may be used on the IEEE 802.11ax system. As described above, since the type of the PPDU format may be set in various manners, the scope of the present invention is not limited to the HE PPDU of FIG. 23A. For convenience of description, although FIG. 23 illustrates a HE PPDU format set in a unit of 20 MHz on a bandwidth of 80 MHz, the HE PPDU may be transmitted on a bandwidth of 20 MHz, 40 MHz or 160 MHz.

Referring to FIG. 23A, the HE PPDU includes L part (L-STF, L-LTF, L-SIG, RL-SIG) and HE part (HE-SIG-A, HE-STF, HE-LTF, HE-SIG-B). L-STF, L-LTF, L-SIG, RL-SIG, HE-SIG-A and HE-SIG-B may be set in a unit of 1x symbol (3.2us), and HE-STF, HE-LTF and Data may be set in a unit of 4x symbol (12.8us).

In the L part, a legacy preamble is transmitted. The L part may be transmitted in a frequency domain in a unit of 20 MHz. If a bandwidth is greater than 20 MHz, the L part may be transmitted by duplication in a unit of 20 MHz. L-SIG includes packet length information. RL-SIG is a field where L-SIG is repeatedly transmitted to improve reliability of L-SIG.

HE-SIG-A may be transmitted in a unit of 20 MHz in the same manner as the L part. If a bandwidth is greater than 20 MHz, HE-SIG-A may be transmitted by duplication in a unit of 20 MHz. HE-SIG-A may include common control information of multi-users. Contents of common control information included in HE-SIG-A may be determined depending on the type of the PPDU. For example, in case of SU PPDU, HE-SIG-A may include at least one of a format indicator, a TXOP duration, a BSS color field, a DCM (dual carrier modulation) indicator, a UL/DL flag, a bandwidth, a payload GI (guard interval), a PE, a MCS, coding, LTE compression, NSTS (Number of Spatial Streams), STBC, beamforming, CRC (cyclic redundancy check), and a Tail field. In case of MU DL PPDU, HE-SIG-A may include at least one of a format indicator, a TXOP duration, a BSS color field, a DCM indicator, the number of HE-SIG-B field symbols, MCS of HE-SIG-B field, CRC and Tail field. Also, in case of MU UL PPDU, HE-SIG-A may include at least one of a format indicator, a TXOP duration, a BSS color field, a DCM indicator, CRC and Tail field. The aforementioned types of information of the HE-SIG-A field may be joint-encoded.

FIG. 23B is a diagram illustrating a HE-SIG-B field structure of HE PPDU. FIG. 24 illustrates, but not limited to, bandwidths of 40 MHz, 80 MHz and 160 MHz, and the HE-SIG-B field may be transmitted in a unit of 20 MHz. The number of OFDM symbols of the HE-SIG-B field is varied.

If the bandwidth is not greater than 20 MHz, one HE-SIG-B field is transmitted.

If the bandwidth is greater than 20 MHz, each of channels of 20 MHz transmit any one of an odd type HE-SIG-B and an even type HE-SIG-B. For example, the odd type HE-SIG-B and the even type HE-SIG-B may be transmitted alternately. The odd numbered 20 MHz channel transmits the odd type HE-SIG-B, and the even numbered 20 MHz channel transmits the even type HE-SIG-B. In more detail, in case of 40 MHz bandwidth, the odd type HE-SIG-B is transmitted on the first 20 MHz channel, and the even type HE-SIG-B is transmitted on the second 20 MHz channel In case of 80 MHz bandwidth, the odd type HE-SIG-B is transmitted on the first 20 MHz channel, the even type HE-SIG-B is transmitted on the second 20 MHz channel, the same odd type HE-SIG-B is transmitted on the third 20 MHz channel, and the same even type HE-SIG-B is transmitted on the fourth 20 MHz channel. Similarly, transmission is performed even in case of 160 MHz.

In this way, HE-SIG-B may be transmitted repeatedly as the size of the bandwidth is increased. The HE-SIG-B which is repeatedly transmitted may be transmitted by frequency hopping as much as 20 MHz from the 20 MHz channel to which the same type HE-SIG-B is transmitted.

Meanwhile, contents of each of the odd type HE-SIG-B may be different from those of each of the even type HE-SIG-B. However, the odd type HE-SIG-B fields have the same contents. Likewise, the even type HE-SIG-B fields have the same contents.

According to one embodiment, the odd type HE-SIG-B may be configured to include only resource allocation information on odd numbered 20 MHz channels, and the even type HE-SIG-B may be configured to include only resource allocation information on even numbered 20 MHz channels. Unlike this embodiment, according to another embodiment of the present invention, the odd type HE-SIG-B may include resource allocation information on at least a part of the even numbered 20 MHz channels, and the even type HE-SIG-B may include resource allocation information on at least a part of the odd numbered 20 MHz channels.

The HE-SIG-B may include user specific information. For example, the user specific information may include, but not limited to, at least one of station AID, resource allocation information (e.g., allocation size), MCS per STA for DL-OFDMA PPDU, NSTS, coding, STBC and transmission beamforming information.

In more detail, the HE-SIG-B may include a common field and a user specific field. The common field may be prior to the user specific field. The common filed includes information on all of STAs designated to receive PPDU at a corresponding bandwidth. The common field may include resource unit allocation information. The same common field is applied between the odd type HE-SIG-Bs. Likewise, the same common field is applied between the even type HE-SIG-Bs. For example, when four 20 MHz channels constituting 80 MHz are divided into LL, LR, RL and RR, a common block for LL and RL may be included in the common field of the odd type HE-SIG-B, and a common block for LR and RR may be included in the common field of the even type HE-SIG-B.

The user specific field may include a plurality of sub fields. The sub fields may include information specific for individual STA designated to receive PPDU. The common field and the user specific field may be identified from each other in a unit of bit not OFDM symbol.

Figure 23C:
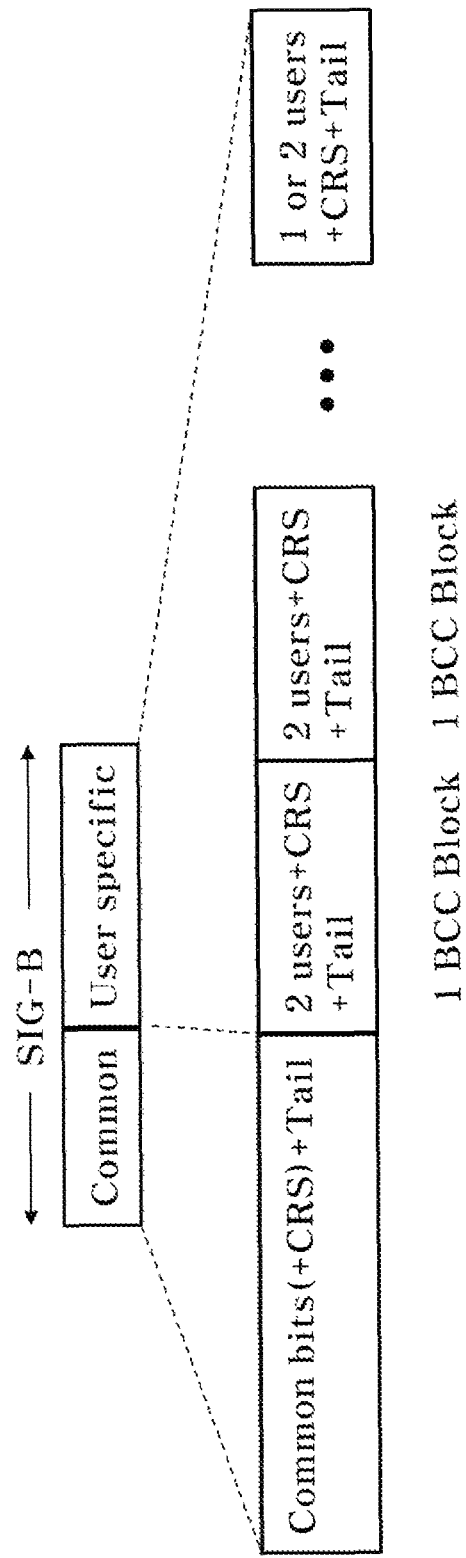
FIG. 23C is a diagram illustrating an encoding structure of HE-SIG_b.

FIG. 23C illustrates an encoding structure of HE-SIG-B according to one embodiment of the present invention. Referring to FIG. 23C, information on 2 users is joint-encoded per BCC block excluding the last BCC (Binary Convolution Code) in the user specific field. The joint-encoded information on the users may include, but not limited to, at least one of STA ID, information (e.g., NSTS, transmission beamforming, MCS and Coding) on single user allocation of RU, and each user information (e.g., Spatial Configuration field, MCS, Coding) on multi-user allocation of RU.

MU Transmission

FIG. 24 is a diagram illustrating a method for performing uplink multi-user (UL MU) transmission in an AP station and a non-AP station.

As described above, the AP may transmit a signal by acquiring TXOP accessible to a medium and reserving the medium through contention. At this time, referring to FIG. 24, the AP station may transmit a trigger frame to a plurality of stations to perform UL MU transmission. At this time, as an example, the trigger frame may include a resource allocation position and size as UL MU allocation information, IDs of stations, MCS, MU type (=MIMO, OFDMA), etc. That is, the AP station may be a frame that transmits a trigger frame to a plurality of stations to allow the plurality of stations to perform uplink data transmission. At this time, as an example, the plurality of stations may transmit data to the AP, after the passage of SIFS, on the basis of a format indicated by the trigger frame. Afterwards, the AP may transmit ACK/NACK information to the station, whereby UL MU transmission may be performed.

FIG. 25 is a diagram illustrating an A-MPDU (Aggregate-MPDU) frame structure for UL MU transmission. In UL MU transmission, a plurality of stations may perform data transmission at the same time by respectively receiving their resource allocation information. To this end, an A-MPDU format may be used. In more detail, referring to FIG. 25(*a*), the A-MPDU may include a plurality of A-MPDU subframe fields and EOF (End of Frame) pad fields. At this time, information on each of the plurality of stations may be delivered through each A-MPDU subframe. At this time, as an example, referring to FIG. 25(b), the A-MPDU subframe may include an MPDU delimiter, MPDU and PAD fields. Also, as an example, referring to FIG. 25(c), the MPDU delimiter field may include EOF, MPDU length, CRC, Delimiter Signature and Reserved fields.

For example, the EOF field may include 1 bit. At this time, the EOF field may be a field indicating whether the corresponding subframe is the last of the frame. At this time, as an example, the A-MPDU subframe of which MPDU length field is set to 0 and EOF is set to 1 cannot be arranged prior to another A-MPDU subframe of which EOF is set to 0. That is, the A-MPDU subframe of which MPDU length field is set to 0 and EOF is set to 1 may be the last A-MPDU subframe of the frame.

Also, the MPDU length field may be a field indicating a length of MPDU. At this time, if the MPDU length field is set to 0, MPDU may not exist. Also, as an example, the A-MPDU subframe of which MPDU length field is set to 0 may be used to indicate start or end frame.

Also, the Delimiter Signature field may be formed in an independent pattern to search for MPDU delimiter. That is, the Delimiter Signature field may be a field used to identify each A-MPDU subframe.

Hereinafter, the term STA may mean non-AP STA unless specially limited.

In the IEE 802.11ax, the AP may transmit and receive a signal to and from multiple users on the basis of OFDMA or MU-MIMO.

Figure 26:
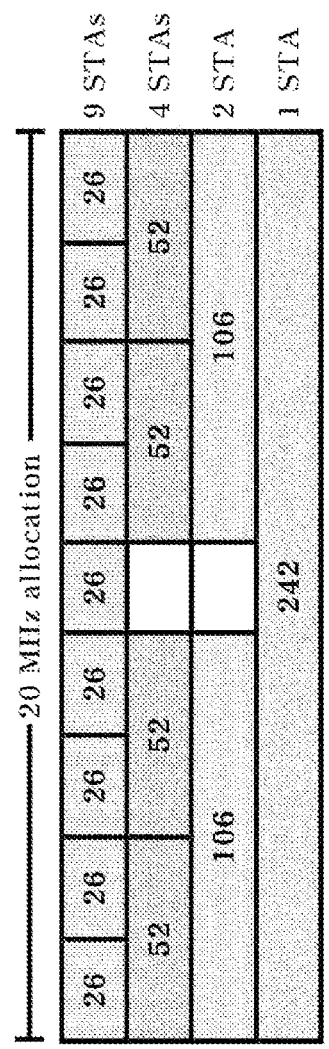
FIG. 26 is a diagram illustrating resources available at 20 MHz channel in case of signal transmission based on OFDMA.

FIG. 26 is a diagram illustrating resources available at 20 MHz channel in case of signal transmission based on OFDMA. Each numbers in blocks means the number of tones (e.g., subcarriers).

Referring to FIG. 26, in case of signal transmission based on the smallest chunk (e.g., 26 tones), STAs up to maximum 9 may be supported. In case of MU-MIMO, STAs up to maximum 8 may be supported.

MU-MIMO

Hereinafter, in MU-MIMO based transmission of a WLAN system (e.g., IEEE 802.11ax), a method for reducing blind decoding complexity of STA that has received a signal and efficiently indicating user specific information will be described. For example, the user specific information may include streams assigned to the STA, information on LTF, etc.

As described above, in the case that a signal is transmitted or received using a wide bandwidth, for example, 40 MHz, 80 MHz, or 160 MHz, HE-SIG-A is transmitted by duplication per channel of 20 MHz. Also, HE-SIG-B that includes user specific information may be set differently per channel of 20 MHz.

As illustrated in FIG. 23a, the IEEE 802.11ax system is based on that specific information is transmitted to the STA through HE-SIG-B. However, information of HE-SIG-B specific to the STA may be transmitted to the STA by being included in HE-SIG-A for common control information or through HE-SIG-B depending on the number of STAs, which transmit or receive a signal, for example, depending on transmission for a single STA or transmission of multiple STAs.

Also, for efficiency of HE-SIG-B and to reduce overhead, HE-SIG-B may be transmitted by being classified into a non-user specific part and a user specific part.

In the case that a signal is transmitted to the STAs using MU-MIMO in the IEEE 802.11ax system, each STA should know transmission information on another STA to know its transmission information. The transmission information on each STA may mean, but not limited to, a starting point of LTF and the number of streams assigned to the STA. The number of LTF symbols is determined depending on the number of streams. For example, one LTF symbol is required in case of one stream, two LTF symbols are required in case of two streams, and four LTF symbols are required in case of three or four streams. Therefore, the STA should acquire, from an LTF field, information equivalent to LTF symbol length corresponding to the number of streams assigned from a point where its LTF information starts. Meanwhile, it is assumed that AP transmits MU-MIMO to a first STA, a second STA and a third STA and does not signal LTF starting point of each STA explicitly. It is also assumed that LTF of the third STA is arranged at the last point. In this case, the LTF starting point of the third STA may be identified through 'LTF length of the first STA+LTF length of the second STA'. Since the LTF length of the first STA is determined through the number of streams assigned to the first STA and the LTF length of the second STA is determined through the number of streams assigned to the second STA, the third STA should know the number of streams assigned to the first STA and the number of streams assigned to the second STA to know its LTF starting point. In this way, each STA should know transmission information on another STA to know its transmission information.

However, if the STA performs blind-decoding even for transmission information on another STA to acquire transmission information on another STA, a problem occurs in that decoding complexity of the STA is increased.

Unlike this case, if user specific HE-SIG-B is CRC-masked with PAID (Partial AID) to reduce overhead caused by blind-decoding, the other STA except the STA having the corresponding PAID cannot decode information masked with PAID. Since the STA cannot know HE-SIG-B information on the other STAs, a problem occurs in that the STA cannot know where streams or LTF assigned thereto start.

One embodiment of the present invention suggests a method for reducing complexity of blind-decoding in MU-MIMO based transmission and at the same time efficiently indicating streams and LTF information assigned to STA.

Case 1. Case that HE-SIG-A includes non-user specific information of HE-SIG-B

First of all, as shown FIG. 27, a case that MU-MIMO frame includes HE-SIG-A and user specific HE-SIG-B will be described.

Figure 27:
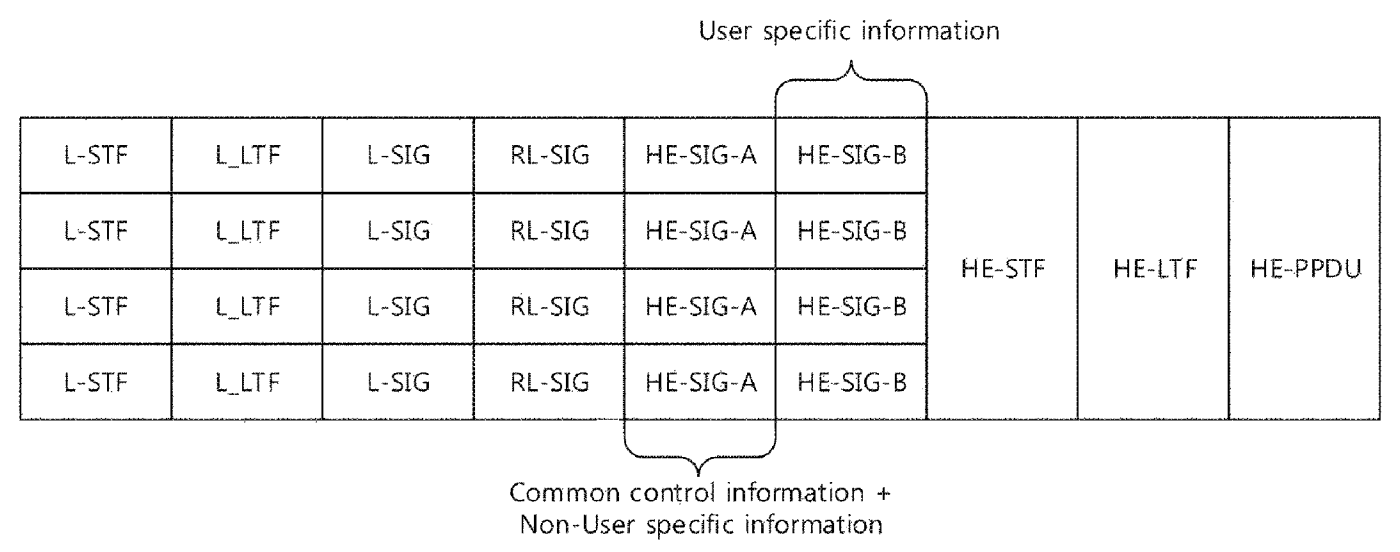

If common control information and information specific to STA are transmitted using a structure shown in FIG. 27, information transmitted from HE-SIG-A is duplicated per 20 MHz. Therefore, a transmitting STA may indicate whether frame format or MU-MIMO operation is performed in HE-SIG-A, whereby a receiving STA may determine whether MU-MIMO transmission is performed.

For example, the transmitting STA may indicate a PPDU format such as SU-PPDU, MU-PPDU, OFDMA-PPDU or UL-PPDU(OFDMA and MU) by using 2-bit HE-SIG-A, whereby the receiving STA may determine operation for MU-MIMO. As another method, the transmitting STA may indicate SU (single user) transmission or MU (multi user) transmission by using a 1-bit format indicator within HE-SIG-A, whereby the receiving STA may determine whether MU-MIMO is performed in HE-SIG-B. Meanwhile, title and size of the format indicator are intended for convenience of description, and may be set to another name and size.

The transmitting STA may mask CRC of user specific HE-SIG-B transmitted per 20 MHz with GID (Group ID) and transmit the masked CRC during MU-MIMO operation after indicating a format in HE-SIG-A as above. For example, the receiving STA may be configured to attempt blind-decoding of HE-SIG-B by using GID only if the format indicator indicates MU transmission. If the format indicator indicates SU transmission, since CRC of HE-SIG-B is not masked through GID, it is not required to perform blind-decoding of HE-SIG-B by using GID.

The receiving STA may identify a channel of 20 MHz assigned thereto by decoding only a channel of 20 MHz CRC-masked with its GID without decoding all of channels of 20 MHz when a full bandwidth is 80 MHz, for example. Therefore, if the channel of 20 MHz assigned to the receiving STA is detected, the receiving STA does not perform blind-decoding for the other channels. That is, the receiving STA does not need to decode HE-SIG-B of all of channels of 20 MHz during MU-MIMO transmission.

Also, HE-SIG-B for each STA within the channel of 20 MHz may be transmitted in accordance with the order of streams assigned to each STA. The STA may identify information (e.g., number of stream) on the other STAs by performing decoding in the order of received HE-SIG-B within the channel of 20 MHz that may be decoded with its GID. Therefore, the STA may identify information on streams of the other STAs assigned prior to itself until the information (e.g., number of stream) on streams assigned thereto is identified through the channel of 20 MHz.

As described above, since the STA may know stream information on STAs assigned prior to itself in due order, the STA may know a starting point of streams assigned thereto, for example, a starting point of LTF. Therefore, since LTF information, for example, LTF starting point information does not need to be included in user specific HE-SIG-B, overhead of HE-SIG-B may be reduced.

According to another embodiment of the present invention, the transmitting STA may transmit user specific HE-SIG-B, which includes information on the receiving STA, by masking the user specific HE-SIG-B with PAID/AID. In this case, only the receiving STA to which the corresponding PAID/AID is assigned may perform decoding of the user specific HE-SIG-B. Therefore, the transmitting STA may include the number of streams for the corresponding receiving STA and indication for LTF starting in the user specific HE-SIG-B. As a result, the receiving STA may identify the number of streams assigned thereto and a position where its stream starts among a plurality of streams transmitted within 20 MHz. Meanwhile, the indication for LTF starting may be set considering the number of streams supported in the wireless LAN system. For example, since the number of streams supported in 11ac is 8, the indication for LTF starting may be set to 3 bits.

Figure 28:
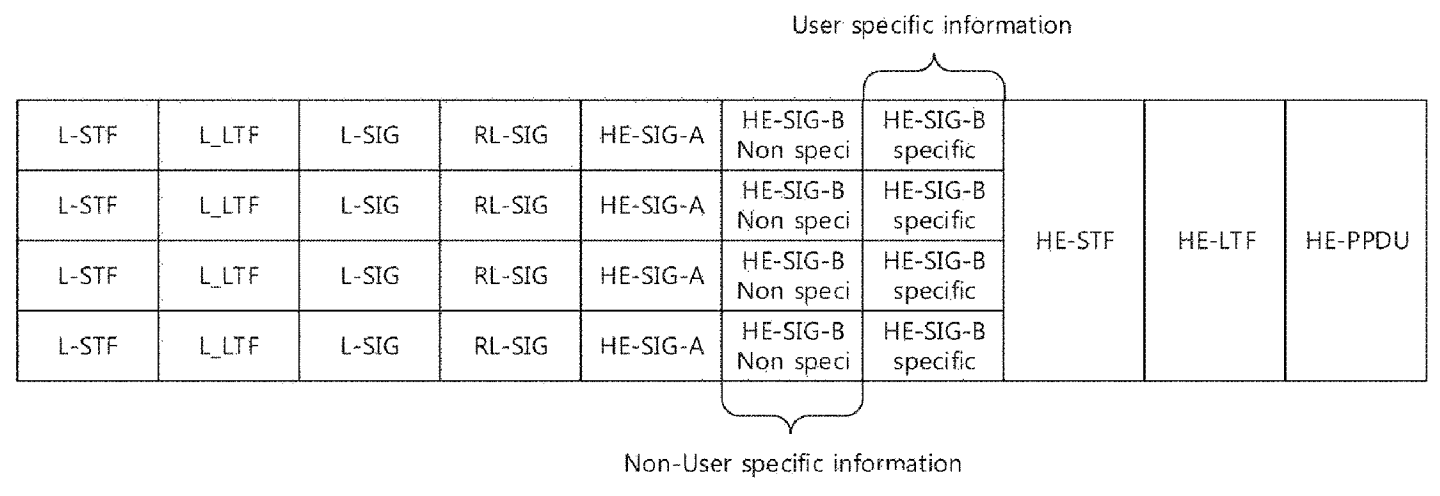

Case 2. Case that HE-SIG-B is classified into non-user specific part and a user specific part Referring to FIG. 28, HE-SIG-B is classified into a non-user specific part and a user specific part. A method for providing stream information to STA when MU-MIMO frame structure shown in FIG. 28 is used will be suggested.

(1) Method for masking a non-user specific part of HE-SIG-B with GID and masking a user specific part with PAID If the non-user specific part is masked with GID and transmitted through a channel of 20 MHz, STAs may determine whether they have been assigned to the corresponding channel of 20 MHz through the non-user specific part. If the channel of 20 MHz to which the STA is assigned is identified, the STA decodes information assigned thereto in the user specific part by using PAID. Since the user specific part is masked with PAID, the STS cannot read information on the other STAs. Therefore, the AP may include information such as Nsts and LTF starting index in the user specific HE-SIG-B, whereby the STA may identify streams assigned thereto, information on LTF, and LTF starting point.

(2) Method for masking non-user specific part of HE-SIG-B with GID and transmitting order information of streams assigned to STA by being included in non-user specific part In this embodiment, the transmitting STA may include stream order information on the receiving STAs in the non-user specific part. The non-user specific part of HE-SIG-B may be masked with GID. Also, the user specific part may be masked with PAID of each STA in accordance with the order of streams assigned to each STA.

For example, it is assumed that x streams are assigned to STA1 having PAID 1, y streams are assigned to STA2 having PAID 2 and z streams are assigned to STA 3 having PAID 3. Also, it is assumed that the STA1, the STA2 and the STA3 have the same GID. At this time, the non-user specific part may include {y|x|z} as the stream order information. The user specific part may include {user information 1 masked with PAID 2|user information 2 masked with PAID 1|user information 3 masked with PAID 3}.

If decoding of the non-user specific part is successfully performed using GID, the STA 1 attempts decoding the user specific part with its PAID 1. The STA 1 attempts decoding of the user information 1 through PAID 1 but is failed. Afterwards, the STA 1 may identify that its streams assignment order is the second by successfully decoding the user specific information 2 through PAID 1. Therefore, the STA 1 may identify that the number of streams assigned thereto is x and y streams exist prior to itself. LTF starting point of the STA 1 has an offset equivalent to LTF length corresponding to the y streams, and LTF length of the STA 1 corresponds to x streams.

If the non-user specific part is masked with GID and then transmitted by MU-MIMO as above, the STAs may determine whether they have been assigned to the corresponding channel, through the non-user specific part. Also, the stream order of the STAs, which are assigned, may be indicated through the non-user specific part. Therefore, the STA that has decoded the non-user specific part may identify the stream assigned thereto from the corresponding channel and LTF starting point. Therefore, in this case, information on LTF starting index for the STA may be omitted from the user specific part.

The non-user specific part may be masked with GID. Even in this case, it is not required to transmit information on streams such as LTF starting index to the user specific part.

Figure 29:
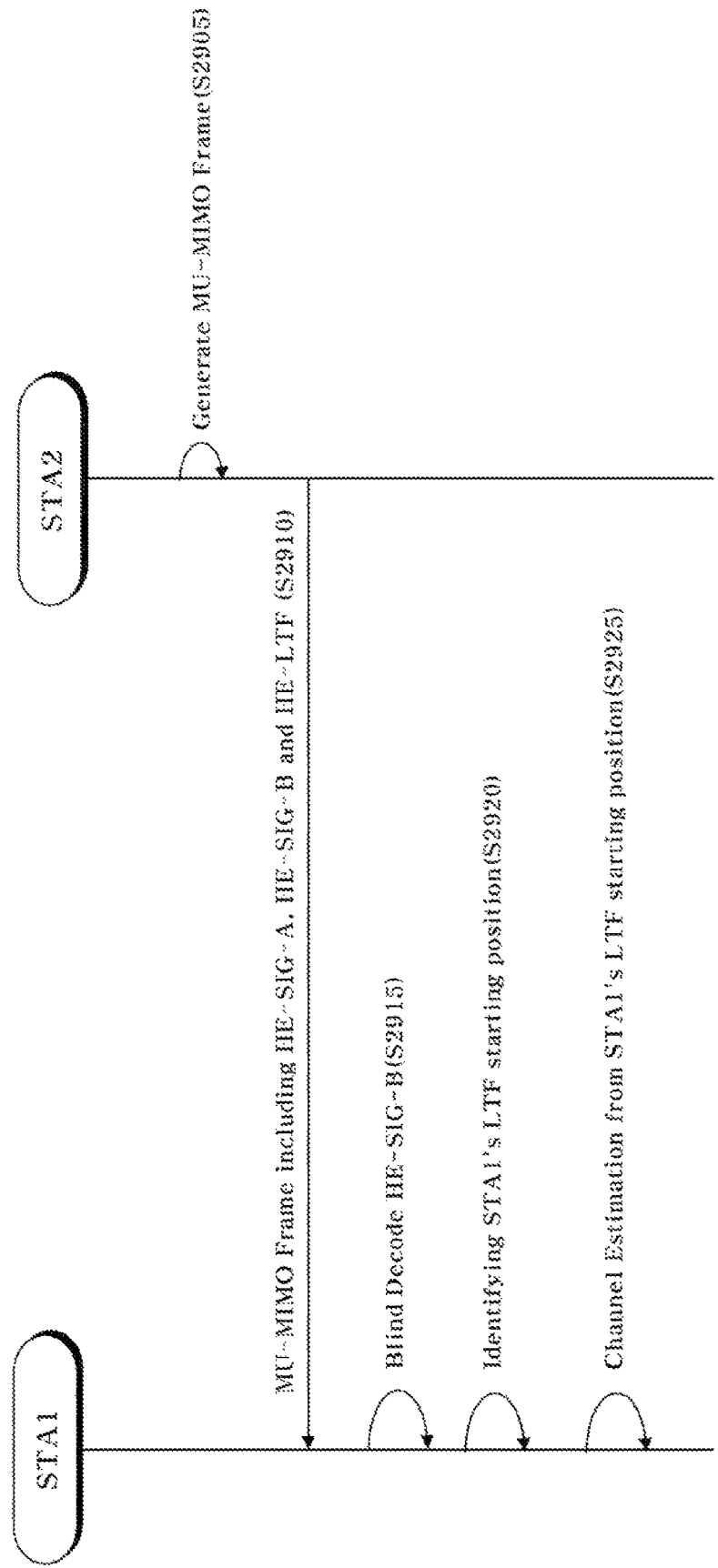
FIG. 29 is a diagram illustrating a method for transmitting and receiving a signal in accordance with one embodiment of the present invention.

FIG. 29 illustrates a flow chart of a method for transmitting and receiving a signal based on at least a part of the aforementioned embodiments. Repeated description of the aforementioned description will be omitted.

In FIG. 29, it is assumed that STA 1 is a receiving STA and STA 2 is a transmitting STA. The STA 1 may be a non-AP STA or AP STA. Likewise, the STA 2 may also be a non-AP STA or AP STA.

First of all, the STA 2 generates MU-MIMO frame (S2905). The MU-MIMO frame may include HE-SIG-A field, HE-SIG-B field, HE-STF (short training field), and HE-LTF that provides training symbols. In addition, L-part and HE-DATA part may further be included in the MU-MIMO frame. For example, HE-STF may provide, but is not limited to, training symbols for at least one of signal detection, AGC (Automatic Gain Control), diversity selection and accurate time synchronization acquisition, and HE-LTF may provide, but is not limited to, training symbols for at least one of channel estimation and frequency error estimation. The STA 2 may mask CRC of HE-SIG-B field with GID in generating the MU-MIMO frame. The HE-SIG-B field may be CRC (cyclic redundancy check)-masked with GIDs different from each other per 20 MHz channel.

The STA 1 receives the MU-MIMO frame (S2910).

The STA 1 performs blind-decoding for the HE-SIG-B field by using GID assigned thereto (S2915). Blind-decoding of the SIG-B field may be performed in a unit of 20 MHz channel. The HE-SIG-B field may include information (e.g., Nsts) on the number of streams assigned to each of multiple stations that receive the MU-MIMO frame. As the STA 1 performs blind decoding for the HE-SIG-B field in a unit of 20 MHz channel, the number of streams assigned to each of the other STAs that belong to the same group as the STA 1 may be acquired together with the number of streams assigned to the STA 1.

The STA 1 identifies a starting position of a training symbol interval of the STA 1 within HE-LTF on the basis of the blind-decoding result of HE-SIG-B (S2920). The starting position of the training symbol interval of the STA1 may be indicated implicitly by the number of streams assigned to each of the other stations belonging to the same group, which shares GID with the STA 1, and the order of streams assigned to the STA 1 within the same group. The order of streams assigned to the STA 1 within the same group may be indicated by the arrangement order of information on the number of streams assigned to the STA 1 within the HE-SIG-B field.

The length of the training symbol interval of the STA 1 may correspond to the number of streams assigned to the STA 1.

The STA1 estimates a channel of streams assigned thereto on the basis of the starting position of the training symbol interval within HE-LTF (S2925).

According to one embodiment, the HE-SIG-A field may include a frame format indicator. In this case, in blind-decoding of the HE-SIG-B field, GID may be used when the frame format indicator indicates MU MIMO format.

According to another embodiment, the HE-SIG-B field may include a non-user specific part CRC-masked with GID or a user specific part masked with each AID (Association ID) or PAID (Partial AID) of each of the multiple STAs.

According to the other embodiment, the non-user specific part may be omitted from the HE-SIG-B field of the MU MIMO frame, and the user specific part of the HE-SIG-B field may be CRC-masked with GID.

Figure 30:
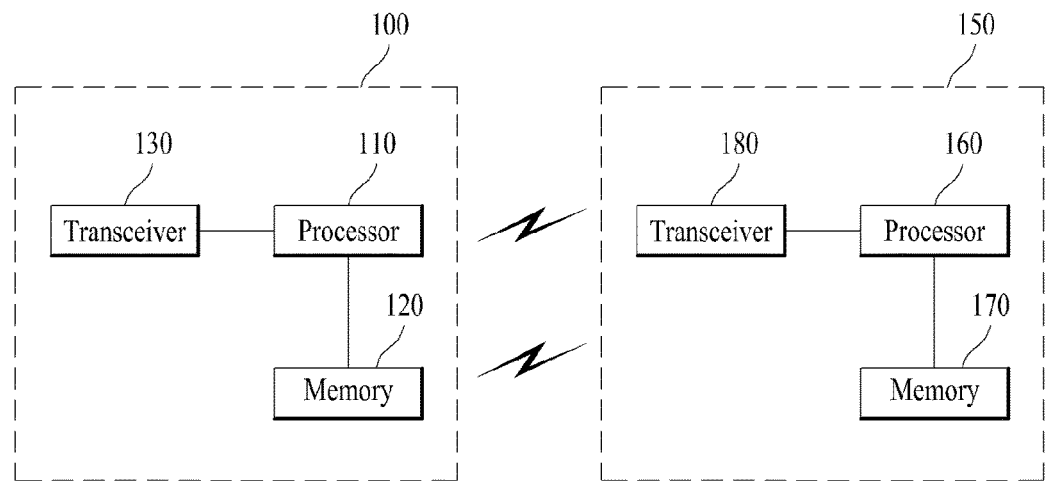
FIG. 30 is a block diagram illustrating an exemplary configuration of an AP apparatus (or base station) and a station apparatus (or UE).

FIG. 30 is a block diagram illustrating an exemplary configuration of an AP apparatus (or base station) and a station apparatus (or UE).

The AP 100 may include a processor 110, a memory 120, and a transceiver 130. The station 150 may include a processor 110, a memory 170, and a transceiver 180.

The transceiver 130 and 180 may transmit/receive a radio signal, and may implement a physical layer according to the IEEE 802 system. The processor 110 and 160 may be connected with the transceiver 130 and 180 and may implement a physical layer and/or MAC layer according to the IEE 802 system. The processor 110 and 160 may be configured to perform the operation according to one or combination of two or more of the aforementioned embodiments of the present invention. Also, a module for implementing the operation of the AP and the station according to the aforementioned embodiments of the present invention may be stored in the memory 120 and 170, and may be implemented by the processor 110 and 160. The memory 120 and 170 may be included in the processor 110 and 160 or provided outside the processor 110 and 160 and thus connected with the processor 110 and 160 by a means which is known.

The description of the aforementioned AP 100 and the station 150 may be applied to a BS and a UE in another wireless communication system (For example, LTE/LTE-A system).

The details of the aforementioned AP and the station may be configured in such a manner that the aforementioned various embodiments of the present invention may independently be applied to the AP and the station, or two or more embodiments may simultaneously be applied to the AP and the station, and repeated description will be omitted for clarification.

Figure 31:
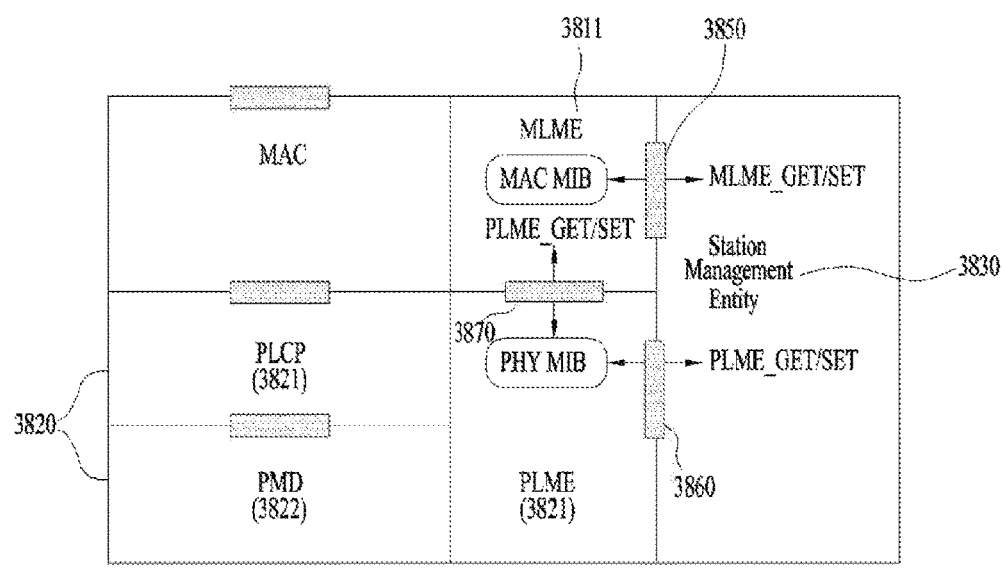
FIG. 31 is a diagram illustrating an exemplary structure of a processor of an AP or a station.

FIG. 31 is a diagram illustrating an exemplary structure of a processor of an AP or a station.

The processor of the AP or the station may have a structure of plurality of layers, and FIG. 31 intensively illustrates a MAC sublayer 3810 and a physical (PHY) layer 3820 on a DLL (data link layer) of these layers. As shown in FIG. 31, the physical layer 3820 may include a PLCP (Physical Layer Convergence Procedure) entity 3821, and a PMD (Physical Medium Dependent) entity 3822. The MAC sublayer 3810 and the PHY layer 3820 include management entities conceptually referred to as MLME (MAC sublayer Management Entity) 3811. These entities 3811 and 3821 provide a layer management service interface in which a layer management function is operated.

To provide an exact MAC operation, an SME (Station Management Entity) 3830 exists within each station. The SME 3830 is a layer independent entity that exists within a separate management plane or may be seen off to the side. Although exact functions of the SME 3830 are not described herein in detail, it may seem that this entity 3830 serves to collect layer-dependent state from various layer management entities (LME) and similarly set values of layer-specific parameters, The SME 3830 may perform these functions on behalf of a general system management entity and implement a standard management protocol.

The entities shown in FIG. 31 mutually act in various manners. FIG. 31 illustrates some examples for exchanging GET/SET primitives. XX-GET.request primitive is used to request a value of a given MIB attribute (management information based attribute information). XX-GET.confirm primitive returns a proper MIB attribute information value if Status is "success", and is used to return error indication in the Status field if not so. XX-SET.request primitive is used to request that the indicated MIB attribute is set to a given value. If the MIB attribute means a specific operation, this is to request that the corresponding operation should be performed. XX-SET.confirm primitive confirms that MIB attribute indicated if status is "success" has been set to a requested value, and is used to return an error condition to the status field if not so. If the MIB attribute means a specific operation, this is to confirm that the corresponding operation has been performed.

As shown in FIG. 31, the MLME 3811 and the SME 3830 may exchange MLME_GET/SET primitives through MLME_SAP 3850. Also, various PLCM_GET/SET primitives may be exchanged between the PLME 3821 and the SME 3830 through PLME_SAP 3860, and may be exchanged between the MLME 3811 and the PLME 3870 through MLME-PLME_SAP 3870.

The embodiments of the present invention may be implemented by various means, for example, hardware, firmware, software, or their combination.

In case of implementation based on hardware, the method according to the embodiments of the present invention may be implemented by one or more of application specific integrated circuits (ASICs), digital signal processors (DSPs), digital signal processing devices (DSPDs), programmable logic devices (PLDs), field programmable gate arrays (FPGAs), processor, controller, microcontroller, microprocessor, etc.

In case of implementation based on firmware or software, the method according to the embodiments of the present invention may be implemented in the form of module, procedure or function, which performs the above-described functions or operations. A software code may be stored in a memory unit and then driven by the processor. The memory unit is arranged inside or outside the processor, and may transmit and receive data to and from the processor by various means which are already known.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. The above embodiments are therefore to be construed in all aspects as illustrative and not restrictive. Therefore, the present invention intends not to limit the embodiments disclosed herein but to give a broadest range matching the principles and new features disclosed herein. It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

In this specification, both the product invention and the method invention have been described, and description of both inventions may be made complementally if necessary.

INDUSTRIAL APPLICABILITY

As described above, the embodiments of the present invention may be applied to various wireless communication systems including the IEEE 802.11 system.

The invention claimed is:

1. A method for receiving a signal by a station (STA) in a wireless local area network (LAN) system, the method comprising:

receiving a multi-user (MU) frame including a signal-A (SIG-A) field, a signal-B (SIG-B) field which includes cyclic redundancy check (CRC) information masked with group identifiers (GIDs) different per 20MHz channel, a short training field (STF), and a long training field (LTF) that includes training symbols; and blind decoding the SIG-B field in a unit of a 20MHz channel based on a specific GID assigned to the STA, wherein the SIG-B field includes information on a number of streams assigned to each of multiple STAs that receive the MU frame, wherein a starting position of a training symbol interval for the STA in the LTF is determined based on a number of streams assigned to each of the other STAs in a same group sharing the specific GID with the STA, and an order of streams assigned to the STA in the same group, and wherein the number of the streams assigned to each of the other STAs which belong to the same group is acquired together with the number of the streams assigned to the STA as a result of the blind decoding of the SIG-B field in a unit of 20MHz channel.

2. The method according to claim 1, wherein a length of the training symbol interval of the STA corresponds to a number of the streams assigned to the STA.

3. The method according to claim 1, wherein the order of the streams assigned to the STA in the same group is indicated by an arrangement order of information on the number of streams assigned to the STA in the SIG-B field.

4. The method according to claim 1, wherein the SIG-A field includes a frame format indicator, and wherein in blind decoding of the SIG-B field, the specific GID is used when the frame format indicator indicates a MU multi-input multi-output (MIMO) format.

5. The method according to claim 1, wherein a non-user specific part is omitted from the SIG-B field when the MU frame corresponds to a MU multi-input multi-output (MIMO) format.

6. The method according to claim 1, further comprising:

estimating a channel for the streams assigned to the STA based on the starting position of the training symbol interval of the STA in the LTF.

7. A station (STA) in a wireless local area network (LAN) system, the STA comprising:

a receiver to receive a multi-user (MU) frame including a signal-A (SIG-A) field, a signal-B (SIG-B) field which includes cyclic redundancy check (CRC) information masked with group identifiers (GIDs) different per 20MHz channel, a short training field (STF), and a long training field (LTF) that includes training symbols; and a processor to blind decode the SIG-B field in a unit of a 20MHz channel based on a specific GID assigned to the STA, wherein the SIG-B field includes information on a number of streams assigned to each of multiple STAs that receive the MU frame, wherein a starting position of a training symbol interval for the STA in the LTF is determined based on a number of streams assigned to each of the other stations in a same group sharing the specific GID with the STA, and an order of streams assigned to the STA in the same group, and wherein the number of the streams assigned to each of the other STAs, which belong to the same group is acquired together with the number of the streams assigned to the STA as a result of the blind decoding of the SIG-B field in a unit of 20MHz channel.

8. The STA according to claim 7, wherein a length of the training symbol interval of the STA corresponds to a number of the streams assigned to the STA.

9. The STA according to claim 7,
wherein the order of the streams assigned to the STA in the same group is indicated by an arrangement order of information on the number of streams assigned to the STA in the SIG-B field.

10. The STA according to claim 7,
wherein the SIG-A field includes a frame format indicator, and
wherein in blind decoding of the SIG-B field, the specific GID is used when the frame format indicator indicates a MU multi-input multi-output (MIMO) format.

11. The STA according to claim 7,
wherein a non-user specific part is omitted from the SIG-B field when the MU frame corresponds to a MU multi-input multi-output (MIMO) format.

* * * * *